US012676738B2

(12) United States Patent
Ryu

(10) Patent No.: US 12,676,738 B2
(45) Date of Patent: Jul. 7, 2026

(54) METHOD FOR THRESHOLD SECRET SHARING AND RECONSTRUCTION FOR MULTI-COMPARTMENT

(71) Applicants: Industry-University Cooperation Foundation Hanyang University, Seoul (KR); LTCware Inc., Seoul (KR)

(72) Inventor: Min Soo Ryu, Seoul (KR)

(73) Assignees: Industry-University Cooperation Foundation Hanyang University, Seoul (KR); LTCware Inc., Seoul (KR)

( * ) Notice: Subject to any disclaimer, the term of this patent is extended or adjusted under 35 U.S.C. 154(b) by 516 days.

(21) Appl. No.: 18/139,152

(22) Filed: Apr. 25, 2023

(65) Prior Publication Data

US 2024/0340166 A1 Oct. 10, 2024

(30) Foreign Application Priority Data

Apr. 7, 2023 (KR) ........................ 10-2023-0046387

(51) Int. Cl.
*H04L 9/40* (2022.01)
*H04L 9/08* (2006.01)
*H04L 9/30* (2006.01)

(52) U.S. Cl.
CPC ............ *H04L 9/085* (2013.01); *H04L 9/3093* (2013.01)

(58) Field of Classification Search
CPC ............................ H04L 9/085; H04L 9/3093
See application file for complete search history.

(56) References Cited

U.S. PATENT DOCUMENTS 8,345,861 B2 * 1/2013 Schneider ............... H04L 9/085
                                                    380/283
2019/0306131 A1 * 10/2019 Dolev ................... H04L 63/061
2024/0323002 A1 * 9/2024 Cho ........................ H04L 9/008

FOREIGN PATENT DOCUMENTS

JP        H09-212089 A      8/1997
JP        2004-279526 A     10/2004
JP        2008-098894 A     4/2008
JP        2016-134826 A     7/2016
(Continued)

OTHER PUBLICATIONS

So-Young Park et al., "Weighted Secret Sharing Scheme", Journal of Korean Institute of Information Scientists and Engineers (KIISE), vol. 29, No. 4, 2002, pp. 213-219.
(Continued)

*Primary Examiner* — Thaddeus J Plecha
(74) *Attorney, Agent, or Firm* — Bridgeway IP Law Group, PLLC; Sang Ho Lee; Hyun Woo Shin

(57) ABSTRACT

Provided is a method for threshold secret sharing and reconstruction for multi-compartment, and more particularly, to a method for creating a share and reconstructing a secret in a system constituted by a plurality of compartments. The method for threshold secret sharing for multi-compartments may include: an operation of creating, when at least one second compartment is related toward a first compartment in one direction, an encrypted secret value by using an external share which does not belong to the first compartment, but belongs to the at least one second compartment; an operation of creating a first polynomial for defining the first compartment by using the encrypted secret value; and an operation of creating an internal share of the first compartment by using the first polynomial.

14 Claims, 16 Drawing Sheets

(56) References Cited

FOREIGN PATENT DOCUMENTS

| | | |
|---|---|---|
| KR | 10-2020-0088767 A | 7/2020 |
| KR | 10-2021-0063378 A | 6/2021 |
| KR | 10-2023-0002941 A | 1/2023 |
| KR | 10-2023-0024369 A | 2/2023 |
| WO | 2009/020078 A1 | 2/2009 |
| WO | 2009/025220 A1 | 2/2009 |
| WO | 2011/016401 A1 | 2/2010 |

OTHER PUBLICATIONS

Tassa, Tamir, "Hierarchical threshold secret sharing", Theory of Cryptography Conference 2004, Lecture Notes in Computer Science, vol. 2951, pp. 473-490, 2004.

Ghodosi, Hossein et al., "Secret sharing in multilevel and compartmented groups", In: "SAT 2015 18th International Conference, Austin TX, USA, Sep. 24-27, 2015", Jan. 1, 1998 (Jan. 1, 1998), Springer, Berlin, Heidelberg 032548, XP055421594, ISBN: 3540745491 vol. 1438, pp. 367-378, DOI: 10.1007/BFb0053748.

Kumar, P.V. Siva et al., "Multi-level secret sharing scheme for mobile ad-hoc networks", Int. J. Advanced Networking and Applications, vol. 6, No. 2, Jul. 29, 2014 (Jul. 29, 2014), pp. 2253-2261, XP055667409, ISSN: 0975-0290.

Basit, Abdul et al., "Multi-stage multi-secret sharing scheme for hierarchical access structure", 2017 International Conference on Computing, Communication and Automation (ICCCA), IEEE, May 5, 2017 (May 5, 2017), pp. 557-563, XP033283566, DOI: 10.119/CCAA.2017.8229863 [retrieved on Dec. 19, 2017].

Spranger, Stephanie, "Extended European Search Report issued for EP Application No. 23169722.8", Apr. 10, 2023, EPO, Munich.

* cited by examiner

100

METHOD FOR THRESHOLD SECRET SHARING AND RECONSTRUCTION FOR MULTI-COMPARTMENT

CROSS-REFERENCE TO RELATED APPLICATIONS

This application claims the priority of Korean Patent Application No. 10-2023-0046387 filed on Apr. 7, 2023, in the Korean Intellectual Property Office, the disclosure of which is incorporated herein by reference.

BACKGROUND

Field

The present disclosure relates to a method for threshold secret sharing and reconstruction for multi-compartment, and more particularly, to a method for creating a share and reconstructing a secret in a system constituted by a plurality of compartments.

Description of the Related Art (t, n) threshold secret sharing (TSS) refers to a method which may make n shares from a secret S, and then reconstruct the secret S by using any t shares among n shares.

Representative threshold secret sharing method include Shamir's secret sharing methods using a polynomial and Blakely's secret sharing method using geometric properties. For example, in the Shamir's secret sharing method using a polynomial, a constant term of a polynomial is set as the secret S, and n points through which the polynomial passes are chosen as the shares, and then the polynomial is reconstructed by any t points to reconstruct the secret S. When the secret sharing methods are used, shares are assigned to distributed participants, so secrecy of the secret S is increased and a risk of losing the secret is also lowered.

Participants may be partitioned into a plurality of levels to configure a secret sharing system, which is called hierarchical secret sharing or multilevel secret sharing. In the hierarchical secret sharing, a share of a higher level participant is more powerful than the share of a lower level participant, and this is useful when controlling an access to the secret in various scenarios.

Conjunctive hierarchical secret sharing proposed by Tassa requires the share of the higher level in order to reconstruct the secret in the lower level. For example, the secret may be reconstructed by shares of two vice presidents, but the secret may not be reconstructed by shares of three employees. However, when the share of one vice president is used along with the shares of three employees, it may be possible to reconstruct the secret. Tassa uses derivatives of a polynomial for the conjunctive hierarchical secret sharing, and this has several limitations. First, shares of each level are created from one derivative, so only one compartment of participants may be created in one level. Second, only conjunctive secret reconstruction is possible, so an arbitrary secret reconstruction condition may not be specified. Third, since the derivative is used, Birkhoff interpolation is required, and this is more complicated and difficult to implement than Lagrange interpolation used in conventional polynomial based secret sharing.

SUMMARY

According to various exemplary embodiments of the present disclosure, a method for threshold secret sharing and reconstruction for multi-compartments may create a plurality of compartments in one level, and implement an arbitrary access structure including a conjunctive secret reconstruction condition.

According to various exemplary embodiments of the present disclosure, the method for threshold secret sharing and reconstruction for multi-compartments may apply a Lagrange interpolation by using a polynomial.

According to various exemplary embodiments of the present disclosure, a method for secret sharing for multi-compartments may include: an operation of creating, when at least one second compartment is related toward a first compartment in one direction, an encrypted secret value by using an external share which does not belong to the first compartment, but belongs to the at least one second compartment; an operation of creating a first polynomial for defining the first compartment by using the encrypted secret value; and an operation of creating an internal share of the first compartment by using the first polynomial.

According to various exemplary embodiments of the present disclosure, a method for secret reconstruction for multi-compartments may include: an operation of reconstructing, when at least one second compartment is related toward a first compartment in one direction, a first polynomial of the first compartment by using an internal share which belongs to the first compartment; an operation of acquiring an encrypted secret value by using the reconstructed first polynomial and an external share which belongs to the at least one second compartment; and an operation of decrypting the encrypted secret value by using the external share.

According to various exemplary embodiments of the present disclosure, a method for secret sharing for multi-compartments may include: an operation of creating or extending, when adding a new external share to an access structure to a first compartment, a second compartment related toward the first compartment in one direction; an operation of creating an encrypted secret value by using the external share; an operation of creating a new first polynomial for defining the first compartment by using all of the internal shares which belong to the first compartment and the encrypted secret values; and an operation of additionally creating an internal share which belongs to the first compartment by using the new first polynomial.

According to various exemplary embodiments of the present disclosure, the method for threshold secret sharing and reconstruction for multi-compartments can configure various hierarchical secret sharing systems.

According to various exemplary embodiments of the present disclosure, the method for threshold secret sharing and reconstruction for multi-compartments can define an arbitrary access structure.

According to various exemplary embodiments of the present disclosure, the method for threshold secret sharing and reconstruction for multi-compartments has an advantage of being capable of using a Lagrange interpolation based on a polynomial.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
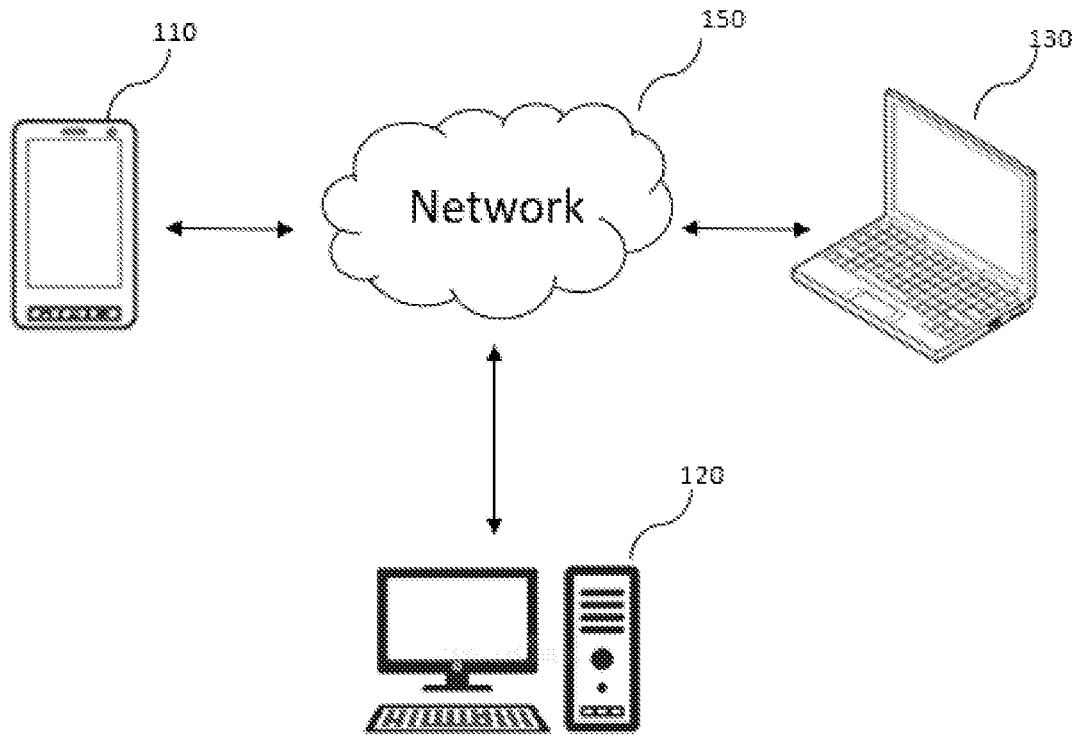
FIG. 1 is a diagram illustrating some components for implementing a threshold secret sharing environment 100 according to an exemplary embodiment of the present disclosure.

The present disclosure may have various modifications and various exemplary embodiments and specific exemplary embodiments will be illustrated in the drawings and described in detail. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one constituent element from another component. The terms are used only to discriminate one constituent element from another component. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form may include a plural form if there is no clearly opposite meaning in the context. Further, in the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, a preferred embodiment of the present disclosure will be described in detail with reference to the accompanying drawings.

FIG. 1 is a diagram illustrating some components for implementing a threshold secret sharing environment 100 according to an exemplary embodiment of the present disclosure.

Referring to FIG. 1, it is assumed that in the threshold secret sharing environment 100, a plurality of electronic devices 110, 120, and 130 may be connected through a network 150 wiredly or wirelessly, and may share or reconstruct a secret through the network 150.

FIG. 1 is an example for description of the present disclosure, and the number of electronic devices is not limited to that in FIG. 1, and the threshold secret sharing environment 100 of FIG. 1 is just one example of environments applicable to the exemplary embodiments, and the environment applicable to the exemplary embodiment is not limited to the threshold secret sharing environment 100 of FIG. 1.

According to various exemplary embodiments, a plurality of user terminals 110, 120, and 130 may be a fixed electronic device or a mobile electronic device implemented by a computer device. The plurality of user terminal devices 110, 120, and 130 includes, for example, a smart phone, a mobile phone, a navigation, a computer, a laptop, a digital broadcasting terminal, personal digital assistants (PDA), a portable multimedia player (PMP), a tablet PC, etc.

As an example, in FIG. 1, as an example of the first electronic device 110, a shape of the smart phone is illustrated, but in the various exemplary embodiments of the present disclosure, the first electronic device 110 may mean one of various physical computer devices which may substantially communicate with other electronic devices 120 and 130 through the network 150 by using a wireless or wired communication scheme.

A device for implementing the method for threshold secret sharing and reconstruction for multi-compartments according to the exemplary embodiment of the present disclosure may be one of the plurality of user terminal devices 110, 120, and 130. For example, the first electronic device 110 may create a share for threshold secret sharing, and the second electronic device 120 and the third electronic device 130 may participate in the threshold secret sharing, and may be shared with the share from the first electronic device 110.

A communication scheme of the network 150 is not limited, and may include a communication scheme utilizing a communication network (e.g., a mobile communication network, a wired Internet, a wireless Internet, and a broadcasting network) which may include the network 150, and also include short-range wireless communication between devices. For example, the network 150 may include one or more random networks among networks such as a personal area network (PAN), a local area network (LAN), a campus area network (CAN), a metropolitan area network (MAN), a wide area network (WAN), a broadband network (BBN), and internet.

Figure 2:
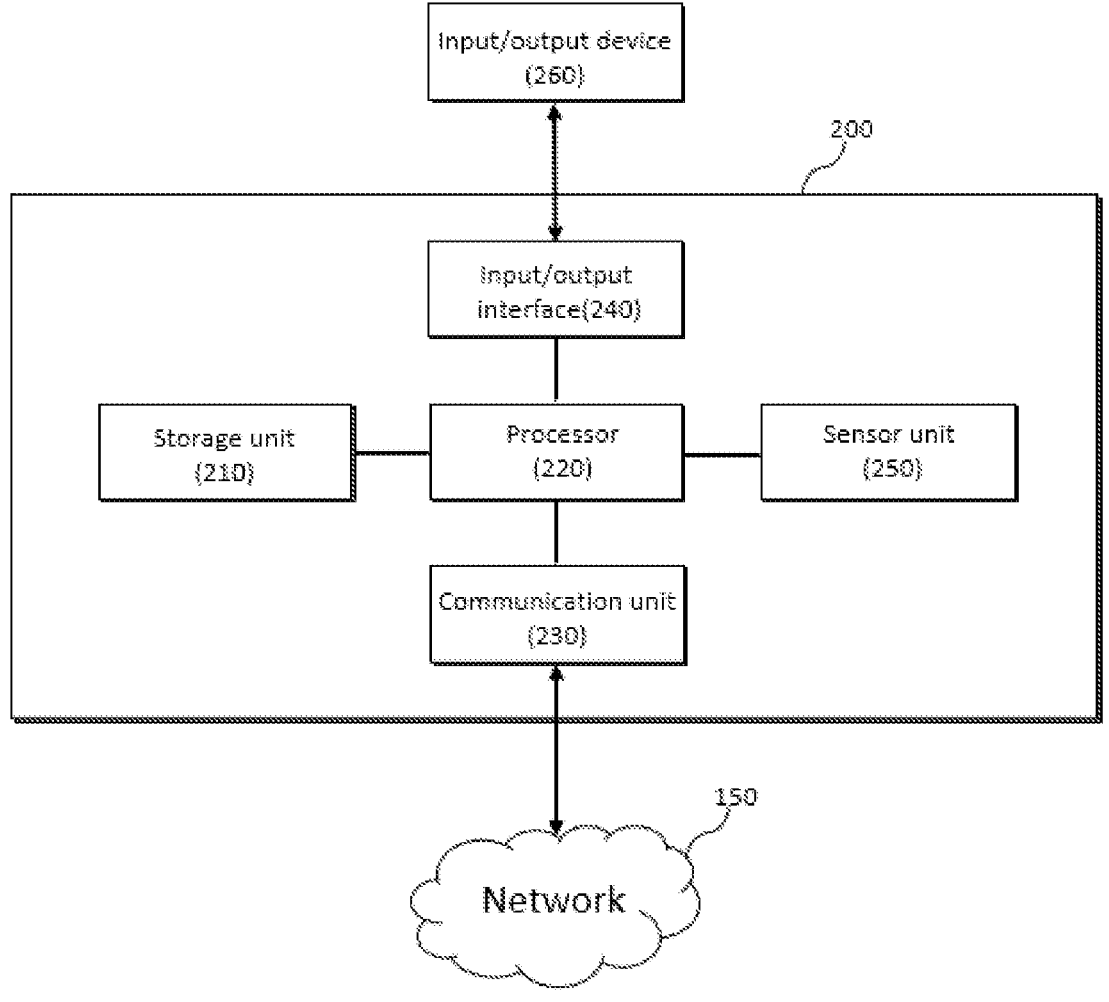
FIG. 2 is a block diagram illustrating some components of an electronic device 200 according to an exemplary embodiment of the present disclosure.

FIG. 2 is a block diagram illustrating some components of an electronic device 200 according to an exemplary embodiment of the present disclosure. Each of the plurality of user terminal devices 110, 120, and 130 described above may be implemented by the electronic device 200 illustrated through FIG. 2, and a method for threshold secret sharing and reconstruction for multi-compartments according to an exemplary embodiment may be implemented by the electronic device 200.

Referring to FIG. 2, the electronic device 200 may include a storage unit 210, a processor 220, a communication unit 230, an input/output interface 240, and a sensor unit 250 as illustrated in FIG. 2.

The storage unit 210 as a computer-readable recording medium may include a permanent mass storage device such as a random access memory (RAM), a read only memory (ROM), and a disk drive. Here, the permanent mass storage device such as the ROM and the disk device as a separate permanent storage device distinguished from the storage unit 210 may also be included in the electronic device 200.

Further, the storage unit 210 may store an operating system and at least one program code. The software components may be loaded to the storage unit 210 from a separate computer-readable recording medium apart from the storage unit 210. The separate computer-readable recording medium may include computer-readable recording media such as a floppy drive, a disk, a tape, a DVD/CD-ROM drive, and a memory card. In another exemplary embodiment, the software components may also be loaded to the storage unit 210 through the communication unit 230 rather than the computer-readable recording medium. For example, the software components may be loaded to the storage unit 210 of the electronic device 200 based on a computer program installed by files received through the network 150.

According to various exemplary embodiments, the storage unit 210 may store a password designated by a user or biometric information.

The processor 220 as a component that controls an overall operation of the electronic device 200 may be configured to perform basic arithmetic, logic, and input/output operations to process an instruction of the computer program. The instruction may be provided to the processor 220 by the storage unit 210 or the communication unit 230. For example, the processor 220 may be configured to execute an instruction received according to a program code stored in the recording device such as the storage unit 210.

The processor 220 may be configured to create, for example, when at least one second compartment is related toward a first compartment in one direction, an encrypted secret value by using an external share which belongs to not the first compartment but at least one second compartment, create a first polynomial defining the first compartment by using the encrypted secret value, and create an internal share of the first compartment by using the first polynomial.

The processor 220 may be configured to create, for example, when at least one second compartment is related toward the first compartment in one direction, the first polynomial defining the first compartment by using at least some of internal shares which belong to the first compartment, acquire an encrypted secret value by using the created first polynomial and the external share which belongs to not the first compartment but at least one second compartment, and decrypting the encrypted secret value by using the external share.

The processor 220 may be configured to create or extend, for example, when adding a new external share to an access structure to the first compartment, a second compartment related to toward the first compartment in one direction, create an encrypted secret value by using the external share which belongs to the second compartment, create a new first polynomial defining the first compartment by using the first encrypted secret value and the encrypted secret value, and additionally create an internal share which belongs to the first compartment by using the first polynomial.

The communication unit 230 may provide a function for mutual communication with other devices (e.g., the above-described storage devices) through the network 150. As an example, the processor 220 of the electronic device 200 may deliver a request or an instruction, data, a file, etc. created according to the program code stored in the recording device such as the storage unit 210 to other devices through the network 150 according to the control of the communication unit 230.

Contrary to this, the electronic device 200 may receive signals, instructions, data, files, etc. from other devices through the communication unit 230 via the network 150. The signal, the instruction, the data, etc. received through the communication unit 230 may be delivered to the processor 220 or the storage unit 210, and the file may be stored in a storage medium (the above-described permanent storage device) which may be further included in the electronic device 200.

The input/output interface 240 may be a means for interfacing with the input/output device 260. For example, the input device may include a microphone, a keyboard, or a mouse, and the output device may include devices such as a display and a speaker. As another example, the input/output interface 240 may also be a means for interfacing with a device in which functions for an input and an output are integrated into one, such as a touch screen.

The sensor module 250 may sense an operation state (e.g., power or temperature) of the electronic device 200, or an external environmental state (e.g., user state), and create an electric signal or a data value corresponding to the sensed state. According to an exemplary embodiment, the sensor module 250 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

Further, in other exemplary embodiments, the electronic device 200 may include more components or less components than the components of FIG. 2. However, most conventional technical components need not be clearly illustrated. For example, the electronic device 200 may be implemented to include at least some of the above-described input/output device 250 or may also further include other components such as a transceiver or a database.

Figure 3:
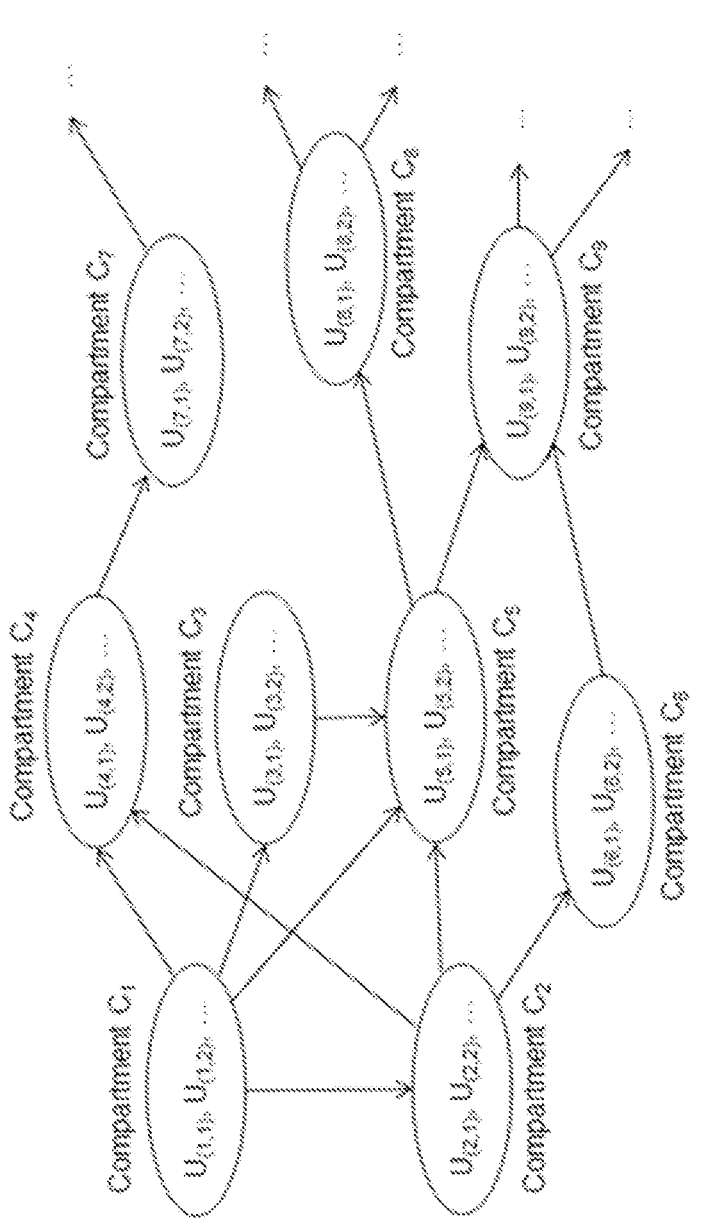
FIG. 3 is a diagram illustrating a directed graph which may represent an arbitrary access structure according to various exemplary embodiments of the present disclosure.

FIG. 3 is a diagram illustrating a directed graph which may represent an arbitrary access structure according to various exemplary embodiments of the present disclosure.

A node represents a compartment constituted by participants, and an arrow represents a condition that the share of the external compartment is required for reconstructing the secret in the compartment. For example, referring to FIG. 3, it may be meant that shares of compartments $C_1$ and $C_2$ are required to reconstruct the secret in a compartment $C_4$. The compartment $C_1$ without the arrow which comes from the external compartment means that the share of the external compartment is not required for reconstructing the secret. When the share of the external compartment is not required for reconstructing the secret like the compartment $C_1$, an internal share of the compartment $C_1$ may be created by using a conventional Shamir method, etc. as it is.

According to various exemplary embodiments of the present disclosure, an access structure may be defined for each compartment. For example, when a set of $n_i$ participants, referred to as share holders, which belong to a compartment $C_i$ is assumed as $U_i=\{U_{(i, 1)}, U_{(i, 2)}, \ldots, U_{(i, ni)}\}$, a secret S may be reconstructed by using shares of $t_i$ internal share holders which belong to $U_i$ and/or shares of external share holders which belong to the other compartment in the compartment $C_i$.

According to various exemplary embodiments of the present disclosure, a set of external share holders required for reconstructing the secret in the compartment $C_i$ may be represented as $r_{i(\cdot)}$. When the number of the sets is $m_i$, $R_i=\{r_{i(1)}, r_{i(2)}, \ldots r_{i(mi)}\}$ may be expressed. That is, it may be meant that when there is one of elements of $R_i$, the secret may be reconstructed jointly with $t_i$ internal share holders of the compartment $C_i$.

According to various exemplary embodiments of the present disclosure, a set of the internal share holders and the external share holders capable of reconstructing the secret in the compartment $C_i$ may be defined as an access set. A collection of the access sets may be defined as an access structure $A_i$ of the compartment $C_i$. For example, the access structure $A_i$ of the compartment $C_i$ may be defined by the power set $2^{Ui}$ of the internal share holder set $U_i$ and the set $R_i$ consisting of the external share holder sets, and the access structure $A_i$ may be defined as in the following equation.

8

$$A_i = \left\{\alpha : \alpha = u \cup r, u \in 2^{Ui}, r \in R_i, |\alpha \cap U_i| \geq t_i\right\}$$

According to various exemplary embodiments of the present disclosure, in the method for threshold secret sharing and reconstruction for multi-compartments, an arbitrary external share holder set may be included in the access structure, so various secret reconstruction conditions may be specified including the conjunctive secret reconstruction condition of the Tassa's method.

A basic idea of the present disclosure is that the secret is encrypted by using the external shares specified by $R_i$, a polynomial for secret sharing is created using the encrypted secret value, and internal shares are generated from the polynomial. The polynomial may be reconstructed by the internal shares, but in this case, only an encrypted secret may be obtained, and in order to decrypt the encrypted secret, the external shares which are used for both encryption and decryption are required.

An encryption method which may be used in the present disclosure is diversified, and when an encryption method which is resistant to a ciphertext-only attack (COA) while preserving a sufficient entropy is used, the security for the secret may be guaranteed. In general, in a secret sharing method using a polynomial, the security for the secret may be guaranteed by using a randomly created polynomial. On the contrary, in the present disclosure, since the polynomial is derived from the encrypted secret values, when the encrypted secret values do not have the sufficient entropy, the security for the secret may not be guaranteed. Further, since the encrypted secret values may be acquired after the polynomial is reconstructed by the internal shares, an encryption algorithm should be resistant to the ciphertext-only attack (COA). Otherwise, there may be a possibility that the secret will be found only by the internal shares.

According to various exemplary embodiments, a set of cryptographic keys for encryption and decryption which may be obtained from a collection of the external share holder sets of the compartment $C_i$, $R_i=\{r_{i(1)}, r_{i(2)}, \ldots, r_{i(mi)}\}$, may be represented as $K_i=\{K_{i(1)}, K_{i(2)}, \ldots, K_{i(mi)}\}$. It is assumed that a method for acquiring a cryptographic key $K_{i(k)}$ from the external shares of each $r_{i(k)}$ is known in advance. For convenience of description, the present disclosure uses a symmetric key, that is the same key for both encryption and decryption. However, this does not limit the present disclosure to symmetric keys, but asymmetric keys may also be used within the idea and technical scope of the present disclosure.

In the following description, it is assumed that an internal share to be assigned to the participant $U_{(i, j)}$ which belongs to the compartment $C_i$ is $V_{(i, j)}$, and the set of the internal shares of the compartment $C_i$ may be represented as $V_i=\{V_{(i,1)}, V_{(i, 2)}, \ldots, V_{(i, ni)}\}$.

Figure 4:
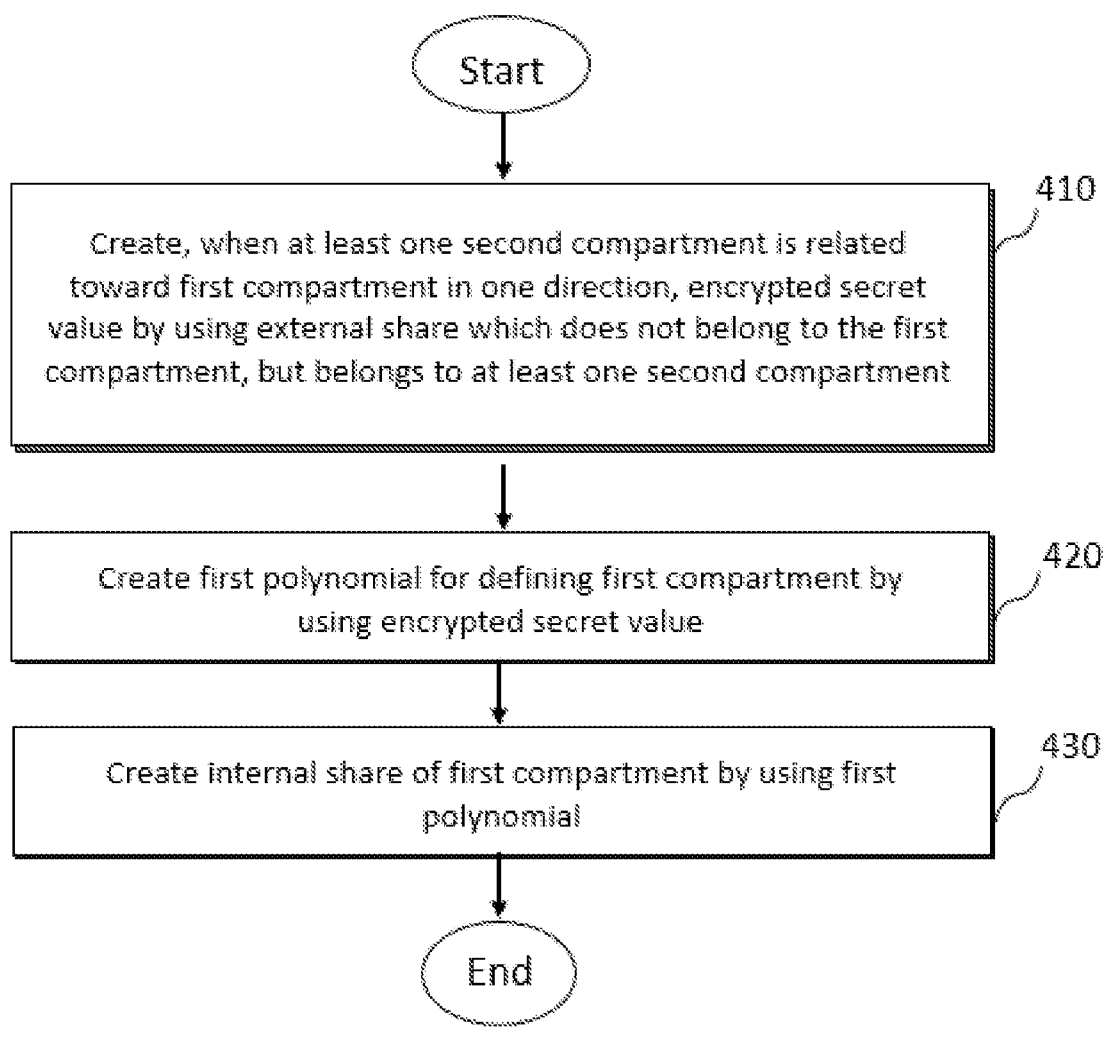
FIG. 4 is a flowchart illustrating a method for creating an internal share of a first compartment for multi-compartment based secret sharing according to various exemplary embodiments of the present disclosure.

FIG. 4 is a flowchart illustrating a method for creating an internal share of a first compartment for multi-compartment based secret sharing according to various exemplary embodiments of the present disclosure.

Referring to FIG. 4, in operation 410, the electronic device (e.g., the electronic devices 110, 120, and 130 of FIG. 1 or the electronic device 200 of FIG. 2) may create the encrypted secret value by using the external share which does not belong to the first compartment, but belongs to at least one second compartment when at least one second compartment is related toward the first compartment in one direction.

According to various exemplary embodiments, the secret sharing system may have a relationship in which the compartment is directed or related in one direction.

By taking FIG. 3 as an example, when the compartment $C_4$ is the first compartment, the compartments $C_1$ and $C_2$ may become the second compartment, and may be related toward the first compartment in one direction. As another example, when the compartment $C_2$ is the first compartment, the compartment $C_1$ may become the second compartment, and may be related toward the first compartment in one direction.

According to various exemplary embodiments, the electronic device may create the encrypted secret value by using the external share which does not belong to the first compartment, but belongs to at least one second compartment. By taking FIG. 3 as an example, when the compartment $C_4$ is the first compartment, and the compartments $C_1$ and $C_2$ are the second compartment, the encrypted secret value may be created by using $\{U_{(1, 1)}, U_{(1, 2)}, \ldots\}$, which belongs to the compartment $C_1$ and/or $\{U_{(2, 1)}, U_{(2, 2)}, \ldots\}$ which belongs to the compartment $C_2$. As another example, when the compartment $C_2$ is the first compartment, and the compartment $C_1$ is the second compartment, the encrypted secret value may be created by using $\{U_{(1, 1)}, U_{(1, 2)}, \ldots\}$ which belongs to the compartment $C_1$.

In operation 420, the electronic device (e.g., the electronic devices 110, 120, and 130 of FIG. 1 or the electronic device 200 of FIG. 2) may create a first polynomial for defining the first compartment by using the encrypted secret value. Hereinafter, for convenience of description, subscripts for $t_i$, $n_i$, $m_i$, etc. are omitted, and represented as t, n, m, etc.

According to various exemplary embodiments, the electronic device may create at least one point which uses the encrypted secret value as a coordinate value, and create the first polynomial passing through the point. For example, the electronic device may create m points $(n+1, E(K_{i(1)}, S))$, $(n+2, E(K_{i(2)}, S))$, $\ldots$ $(n+m, E(K_{i(m)}, S))$ having, as the coordinate, an encrypted value of the secret S by using an encryption algorithm E(key, plaintext), and create a polynomial of degree $(t-1)$ $f_i(x) = a_{t-1}x^{t-1} + a_{t-2}x^{t-2} + \ldots, a_{m-1}x^{m-1}x^{m-1} + a_{m-2}x^{m-2} + \ldots a_0$ having a coefficient $a_{t-1}, a_{t-2}, \ldots, a_m$ randomly selected while passing through m created points.

According to various exemplary embodiments, the electronic device may create at least one coefficient by using the encrypted secret value, and create the first polynomial by using the coefficient. For example, the electronic device may create m coefficients $a_{m-1} = E(K_{i(m)}, S)$, $a_{m-2} = E(K_{i(m-1)}, S)$, $\ldots$, $a_0 = E(K_{i(1)}, S)$ by using the encryption algorithm E(key, plaintext), and create a polynomial of degree $(t-1)$ $f_i(x) = a_{t-1}x^{t-1} + a_{t-2}x^{t-2} + \ldots, a_{m-1}x^{m-1}x^{m-1} + a_{m-2}x^{m-2} + \ldots a_0$ having the created coefficients and the randomly selected coefficients $a_{t-1}, a_{t-2}, \ldots, a_m$.

In operation 430, the electronic device (e.g., the electronic devices 110, 120, and 130 of FIG. 1 or the electronic device 200 of FIG. 2) may create the internal share of the first compartment by using the first polynomial.

By taking FIG. 3 as an example, when the compartment $C_4$ is the first compartment, and the compartments $C_1$ and $C_2$ are the second compartment, the electronic device may create $\{U_{(4, 1)}, U_{(4, 2)}, \ldots\}$ which belongs to the compartment $C_4$ by using the first polynomial. As another example, when the compartment $C_2$ is the first compartment, and the compartment $C_1$ is the second compartment, the electronic device may create $\{U_{(2, 1)}, U_{(2, 2)}, \ldots\}$ which belongs to the compartment $C_2$ by using the first polynomial.

Figure 5A:
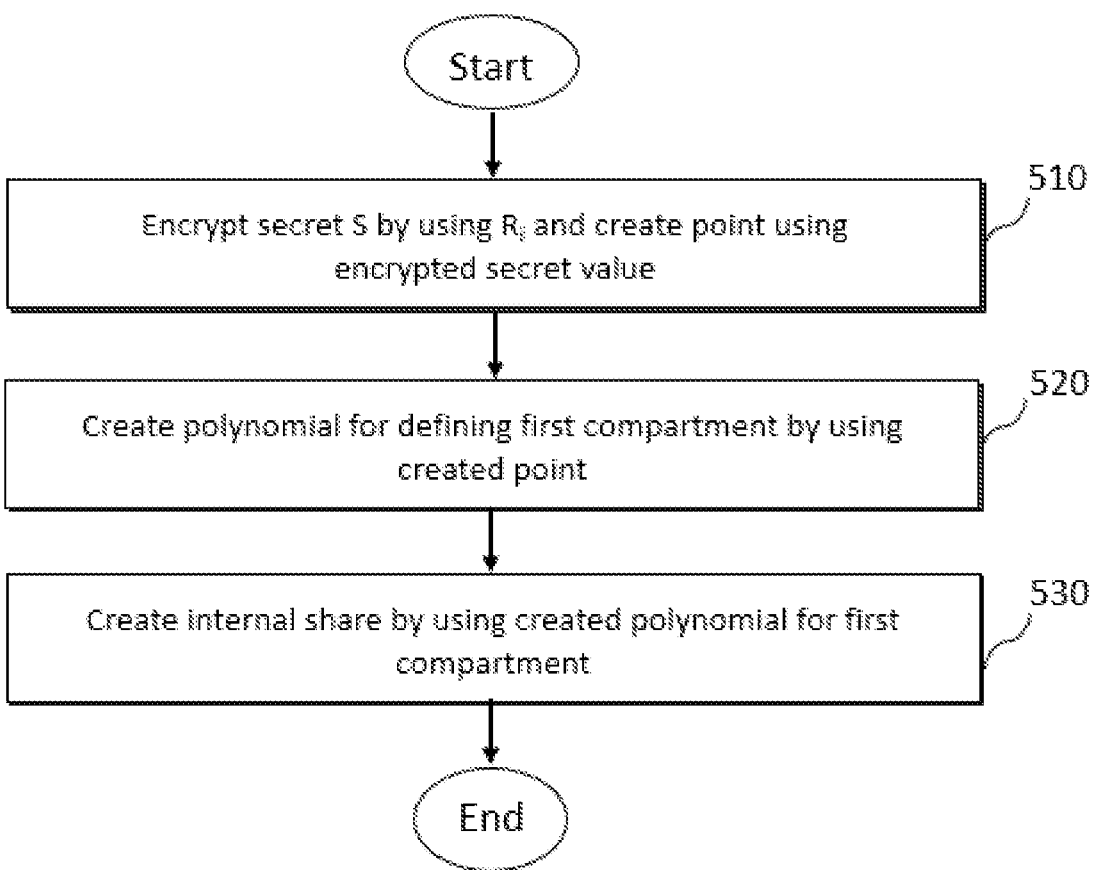
FIGS. 5A and 5B illustrate a method for creating an internal share of a first compartment for multi-compartment based secret sharing by using a polynomial interpolation according to various exemplary embodiments of the present disclosure.
Figure 5B:
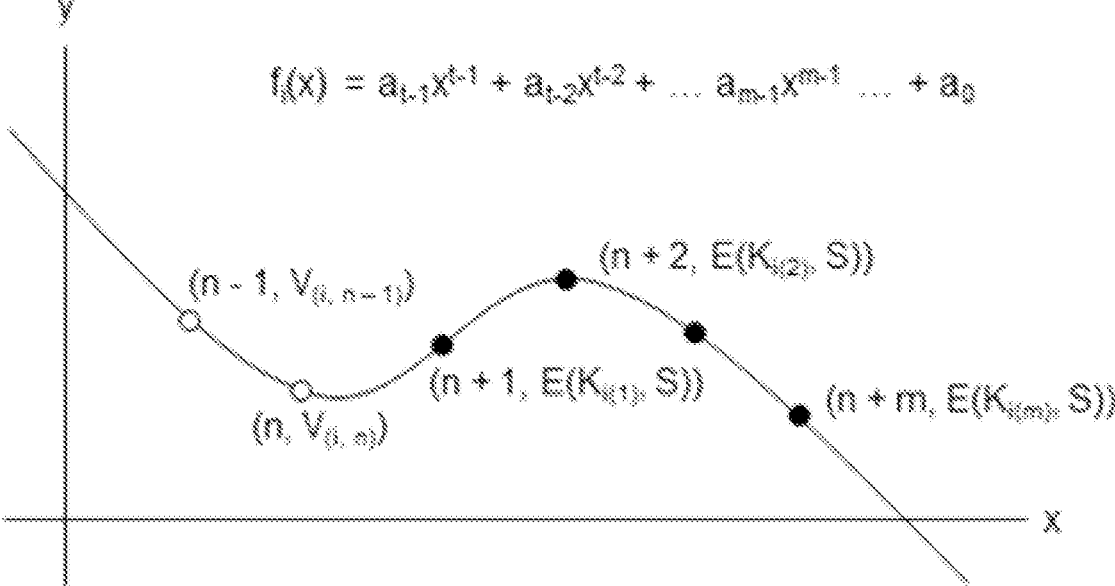

FIGS. 5A and 5B illustrate a method for creating an internal share of a first compartment for multi-compartment based secret sharing by using a polynomial interpolation according to various exemplary embodiments of the present disclosure.

Referring to FIGS. 5A and 5B, a process of first acquiring, when the secret S and $R_i$ are given, $K_i$ from $R_i$, and then creating $n_i$ internal shares for $(t_i, n_i)$ secret sharing is described. Hereinafter, for convenience of description, subscripts for $t_i$, $n_i$, $m_i$, etc. are omitted, and represented as t, n, m, etc.

In operation 510, the electronic device (e.g., the electronic devices 110, 120, and 130 of FIG. 1 or the electronic device 200 of FIG. 2) may encrypt the secret S by using at least some of $R_i$ and create a point which uses the encrypted secret value as a coordinate.

By taking FIG. 5B as an example, the electronic device may select t and n that satisfy $n \geq t \geq m$, and then, create m points $(n+1, E(K_{i(1)}, S))$, $(n+2, E(K_{i(2)}, S))$, $\ldots$, $(n+m, E(K_{i(m)}, S))$ having the encrypted secret value as the coordinate by using the encryption algorithm E(key, plaintext).

In operation 520, the electronic device (e.g., the electronic devices 110, 120, and 130 of FIG. 1 or the electronic device 200 of FIG. 2) may create a polynomial for defining the first compartment by using the created points.

By taking FIG. 5B as an example, the electronic device may create the polynomial of degree $(t-1)$ $f_i(x) = a_{t-1}x^{t-1} + a_{t-2}x^{t-2} + \ldots, a_{m-1}x^{m-1}x^{m-1} + a_{m-2}x^{m-2} + \ldots a_0$ having the randomly selected coefficients $a_{t-1}, a_{t-2}, \ldots, a_m$ while passing through m created points.

In operation 530, the electronic device (e.g., the electronic devices 110, 120, and 130 of FIG. 1 or the electronic device 200 of FIG. 2) may create the internal share by using the polynomial for defining the compartment.

By taking FIG. 5B as an example, the electronic device may create n internal shares $V_{(i, 1)} = f_i(1)$, $V_{(i, 2)} = f_i(2)$, $\ldots$, $V_{(i, n)} = f_i(n)$ from points $(1, f_i(1))$, $(2, f_i(2))$, $\ldots$, $(n, f_i(n))$ through which the polynomial $f_i(x)$ passes, and assign the internal shares to participants $U_{(i, 1)}, U_{(i, 2)}, \ldots, U_{(i, n)}$ of the compartment $C_i$.

Figure 6A:
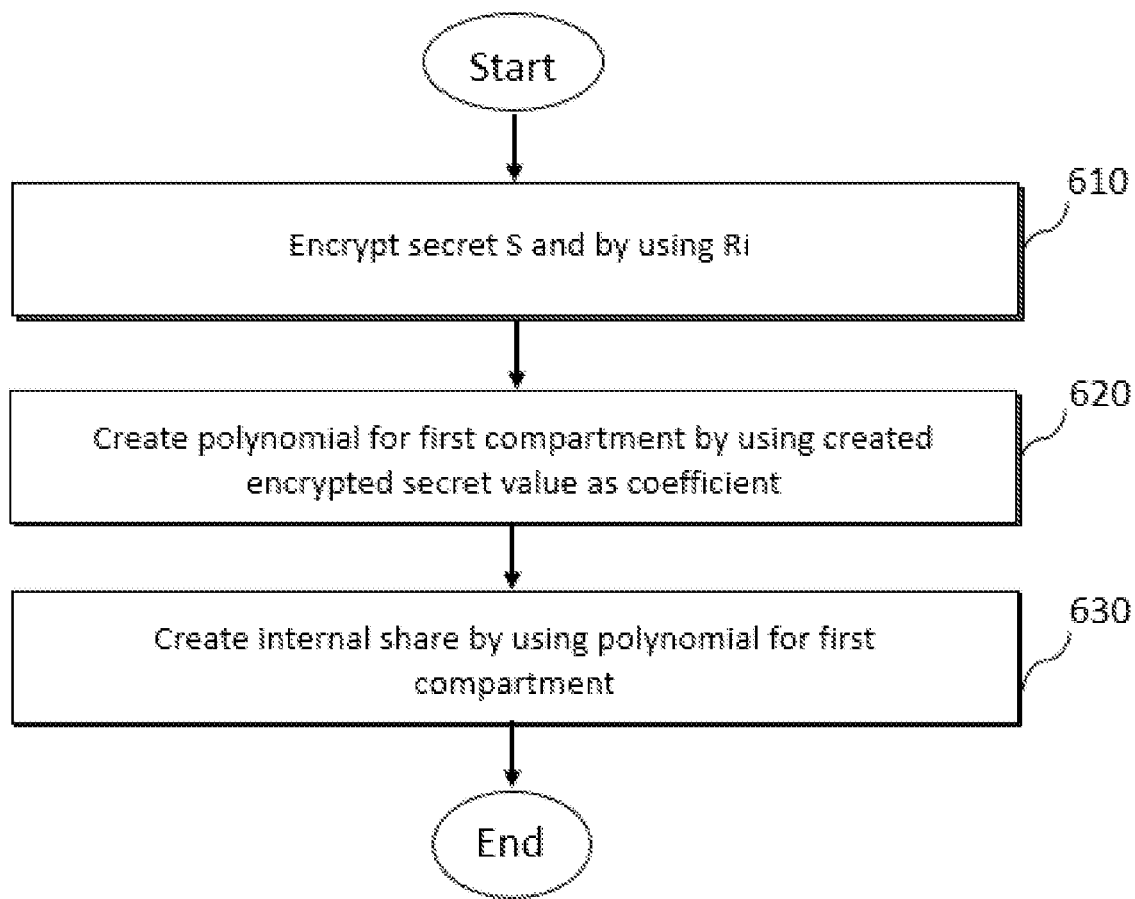
FIGS. 6A and 6B illustrate a method for creating an internal share of a first compartment for multi-compartment based secret sharing by using a secret-encoded polynomial coefficient according to various exemplary embodiments of the present disclosure.
Figure 6B:
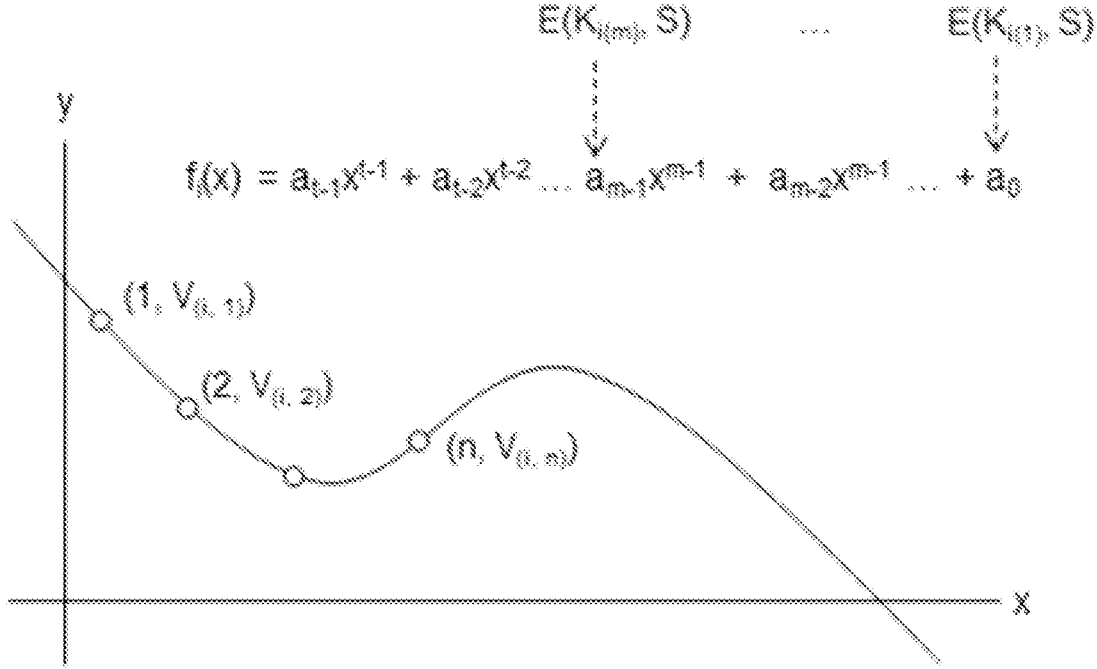

FIGS. 6A and 6B illustrate a method for creating an internal share of a first compartment for multi-compartment based secret sharing by using a secret-encoded polynomial coefficient according to various exemplary embodiments of the present disclosure.

Referring to FIGS. 6A and 6B, a process of first acquiring, when the secret S and $R_i$ are given, $K_i$ from $R_i$, and then creating $n_i$ internal shares for $(t_i, n_i)$ secret sharing is described. Hereinafter, for convenience of description, subscripts for $t_i$, $n_i$, $m_i$, etc. are omitted, and represented as t, n, m, etc.

In operation 610, the electronic device (e.g., the electronic devices 110, 120, and 130 of FIG. 1 or the electronic device 200 of FIG. 2) may create the encrypted secret value by using the secret S and $R_i$.

By taking FIG. 6B as an example, the electronic device may select t and n that satisfy $n \geq t \geq m$, and then, create m coefficients $a_{m-1} = E(K_{i(m)}, S)$, $a_{m-2} = E(K_{i(m-1)}, S)$, $\ldots$, $a_0 = E(K_{i(1)}, S)$ by using the encryption algorithm E(key, plaintext).

In operation 620, the electronic device (e.g., the electronic devices 110, 120, and 130 of FIG. 1 or the electronic device 200 of FIG. 2) may create a polynomial for defining the first compartment by using the created encrypted secret value.

By taking FIG. 6B as an example, the electronic device may create the polynomial of degree $(t-1)$ $f_i(x) = a_{t-1}x^{t-1} + a_{t-2}x^{t-2} + \ldots, a_{m-1}x^{m-1}x^{m-1} + a_{m-2}x^{m-2} + \ldots a_0$ having the created encrypted secret values as the coefficients $a_{m-1}$, $a_{m-2}, \ldots, a_0$ and the randomly selected coefficients $a_{t-1}, a_{t-2}, \ldots, a_m$.

In operation 630, the electronic device (e.g., the electronic devices 110, 120, and 130 of FIG. 1 or the electronic device 200 of FIG. 2) may create the internal share by using the polynomial for defining the compartment.

By taking FIG. 6B as an example, the electronic device may create n internal shares $V_{(i, 1)} = f_i(1)$, $V_{(i, 2)} = f_i(2)$, . . . , $V_{(i, n)} = f_i(n)$ from points $(1, f_i(1))$, $(2, f_i(2))$, . . . , $(n, f_i(n))$ passing through the polynomial $f_i(x)$, and assign the internal shares to participants $U_{(i, 1)}$, $U_{(i, 2)}$, . . . , $U_{(i, n)}$ of the compartment $C_i$.

Figure 7:
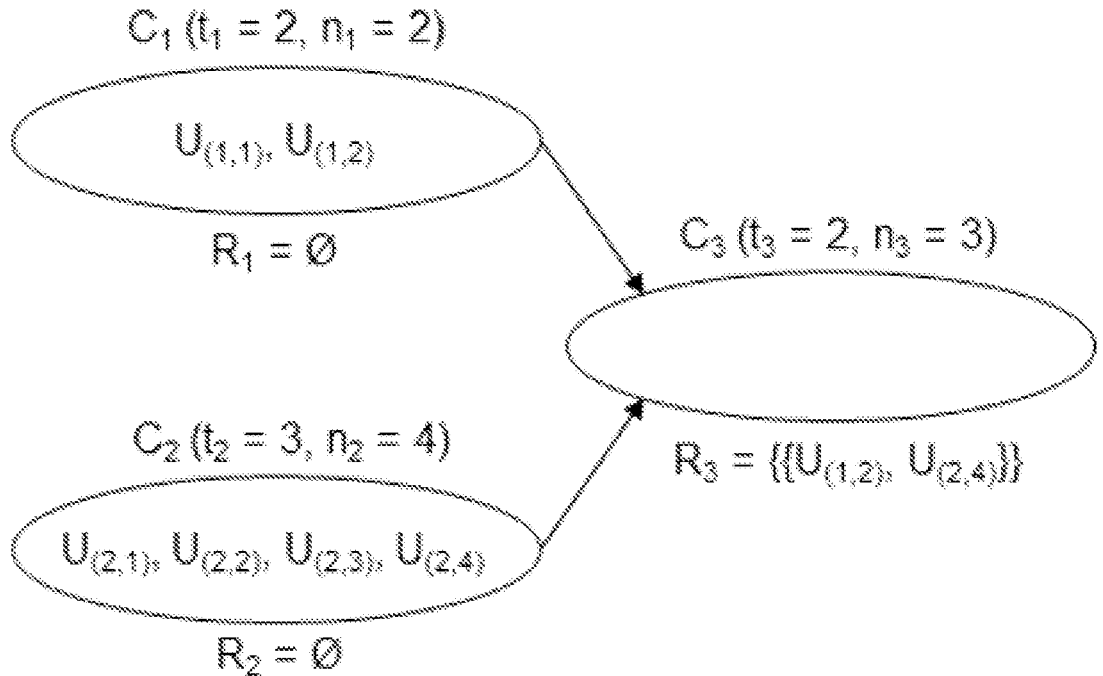
FIG. 7 is a diagram illustrating a state before the internal share of the first compartment is created as an exemplary embodiment of creating the internal share of the first compartment for multi-compartment based secret sharing according to various exemplary embodiments of the present disclosure.

FIG. 7 is a diagram illustrating a state before the internal share of the first compartment is created as an exemplary embodiment of creating the internal share of the first compartment for multi-compartment based secret sharing according to various exemplary embodiments of the present disclosure.

FIG. 7 illustrates an exemplary embodiment of applying the secret sharing on a finite field $F_q$. For convenience of calculation, 19 which is a prime number is assumed as a value of q. As a result, the secret S, the polynomial coefficients, the coordinate values, and the shares used in the secret sharing are all defined in $F_{19}$.

Referring to FIG. 7, a secret sharing system constituted by three compartments is illustrated. It is assumed that two internal shares $V_1 = \{V_{(1, 1)}, V_{(1, 2)}\}$ are already assigned to the compartment $C_1$ and four internal shares $V_2 = \{V_{(2, 1)}, V_{(2, 2)}, V_{(2, 3)}, V_{(2, 4)}\}$ are already assigned to the compartment $C_2$. The internal share is not yet assigned to the compartment $C_3$. In the compartment $C_3$, $t_3 = 2$ and $n_3 = 3$, and three internal shares may be created so as to reconstruct the secret S by any two internal shares and external shares $\{V_{(1, 2)}, V_{(2, 4)}\}$ with respect to the compartment $C_3$.

It is assumed that when the secret $S = 8$, and the secret is encrypted by a key $K_{1(1)}$ which may be obtained by an external share set $\{V_{(1, 2)}, V_{(2,4)}\}$ required for secret encryption, $E(K_{1(1)}, S) = E(K_{1(1)}, 8) = 7$ may be obtained.

(Exemplary Embodiment 1) Method for Creating Internal Share of First Compartment For Multi-ompartment Based Secret Sharing Using Polynomial Interpolation

With respect to FIG. 7, since $m_3 = 1$ and $n_3 = 3$, the electronic device according to various exemplary embodiments may first create one point $(n_{3+1}, E(K_{1(1)}, S))$, that is, $(4, 7)$ having the encrypted secret value 7 as the y-axis coordinate. Since $t_3 = 2$, the electronic device may create a polynomial $f_3(x) = a_1 x + a_0 = 3x + 14$ having the randomly selected coefficient $a_1 = 3$ while passing through the created point $(4, 7)$. Since $n_3 = 3$, the electronic device may create three internal shares $V_{(3, 1)} = f_3(1) = 17$, $V_{(3,2)} = f_3(2) = 1$, and $V_{(3,3)} = f_3(3) = 4$ from three points $(1, f_3(1))$, $(2, f_3(2))$, and $(3, f_3(3))$ through which the polynomial $f_3(x)$ passes.

(Exemplary Embodiment 2) Method for Creating Internal Share of First Compartment For Multi-Compartment Based Secret Sharing Using Encrypted Secret as Polynomial Coefficient

With respect to FIG. 7, since $m_3 = 1$ and $n_3 = 3$, the electronic device according to various exemplary embodiments may first determine one coefficient $a_0 = E_{(K1(1)}, S)$, that is, $a_0 = 7$ by using the encryption algorithm E( ) Since $t_3 = 2$, the electronic device may create a polynomial $f_3(x) = a_1 x + a_0 = 3x + 7$ having the determined coefficient $a_0 = 7$ and the randomly selected remaining coefficient $a_1 = 3$. Since $n_3 = 3$, the electronic device may create three internal shares $V_{(3,1)} = f_3(1) = 10$, $V_{(3,2)} = f_3(2) = 13$, $V_{(3,3)} = f_3(3) = 16$ from three points $(1, f_3(1))$, $(2, f_3(2))$, $(3, f_3(3))$ through which the polynomial $f_3(x)$ passes.

In the secret sharing system of FIG. 7, the access structure $A_3$ of the compartment $C_3$ becomes $\{\{U_{(3, 1)}, U_{(3, 2)}, U_{(1, 2)}, U_{(2, 4)}\}, \{U_{(3, 1)}, U_{(3, 3)}, U_{(1, 2)}, U_{(2, 4)}\}, \{U_{(3, 2)}, U_{(3, 3)}, U_{(1, 2)}, U_{(2, 4)}\}, \{U_{(3, 1)}, U_{(3, 3)}, U_{(1, 2)}, U_{(2, 4)}\}\}$.

Figure 8:
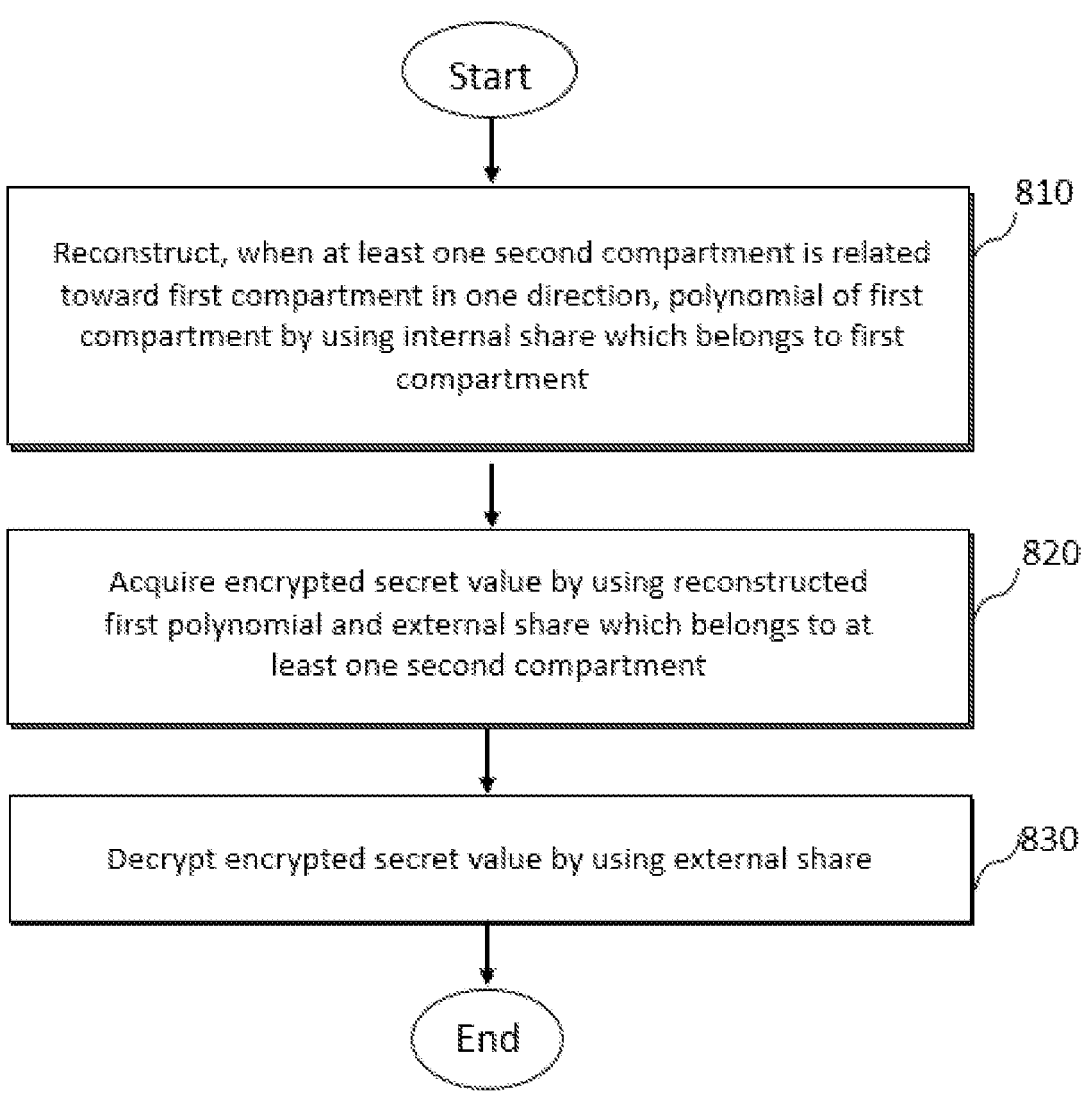
FIG. 8 is a flowchart illustrating a method for reconstructing a secret for multi-compartments according to various exemplary embodiments of the present disclosure.

FIG. 8 is a flowchart illustrating a method for reconstructing a secret for multi-compartments according to various exemplary embodiments of the present disclosure.

Referring to FIG. 8, in operation 810, the electronic device (e.g., the electronic devices 110, 120, and 130 of FIG. 1 or the electronic device 200 of FIG. 2) may reconstruct the first polynomial of the first compartment by using at least some of the internal shares which belong to the first compartment when at least one second compartment is related toward the first compartment in one direction.

According to various exemplary embodiments, the secret sharing system may have a relationship in which the compartment is directed or related in one direction.

By taking FIG. 3 as an example, when the compartment $C_4$ is the first compartment (it is assumed that there is no internal share), the compartments $C_1$ and $C_2$ may become the second compartment, and may be related toward the first compartment in one direction. As another example, when the compartment $C_2$ is the first compartment (it is assumed that there is no internal share), the compartment $C_1$ may become the second compartment, and may be related toward the first compartment in one direction.

According to various exemplary embodiments, the electronic device may reconstruct the first polynomial of the first compartment by using at least some of the internal shares which belong to the first compartment. By taking FIG. 3 as an example, when the compartment $C_4$ is the first compartment, and the compartments $C_1$ and $C_2$ are the second compartment, the electronic device may reconstruct the first polynomial of the compartment $C_4$ by using at least some of $\{U_{(4, 1)}, U_{(4, 2)}, . . . \}$ which belongs to the compartment $C_4$. As another example, when the compartment $C_2$ is the first compartment, and the compartment $C_1$ is the second compartment, the electronic device may reconstruct the first polynomial for defining the compartment $C_2$ by using at least some of $\{U_{(2, 1)}, U_{(2, 2)}, . . . \}$ which belongs to the compartment $C_2$.

According to various exemplary embodiments, the electronic device may reconstruct a polynomial of degree $(t-1)$ by using any t internal shares. For example, the electronic device may reconstruct the polynomial $f_i(x)$ by applying the Lagrange interpolation.

In operation 820, the electronic device (e.g., the electronic devices 110, 120, and 130 of FIG. 1 or the electronic device 200 of FIG. 2) may acquire the encrypted secret value by using the reconstructed first polynomial and the external share which belongs to at least one second compartment.

According to various exemplary embodiments, the electronic device may acquire the encrypted secret value $E(K_{i(k)}, S)$ by calculating a y-axis coordinate value of a point at which the x-axis coordinate value is n+k among the points through which the created polynomial $f_i(x)$ passes. For example, the electronic device may calculate $f_i(n+)$ and acquire the encrypted secret value $E(K_{i(k)}, S)$ by using the relationship $E(K_{i(k)}, S) = f_i(n+k)$.

According to various exemplary embodiments, the electronic device may acquire the encrypted secret value $E(K_{i(k)}, S)$ directly from a coefficient of the created polynomial $f_i(x) = a_{t-1} x^{t-1} + a_{t-2} x^{t-2} + . . . a_{m-1} x^{t-1} + a_{m-2} x^{t-2} + . . . a_0$ by using the relationship $E(K_{i(k)}, S) = a_{k-1}$.

In operation 830, the electronic device (e.g., the electronic devices 110, 120, and 130 of FIG. 1 or the electronic device 200 of FIG. 2) may decrypt the encrypted secret value by using the external share.

According to various exemplary embodiments, the electronic device may acquire a key $K_{i(k)}$ required for decryption from $r_i(k)$, and reconstruct the secret S by using a decryption algorithm D(key, ciphertext). For example, when the encrypted secret value $E(K_{i(k)}, S)$ is acquired, the electronic device may reconstruct the secret S as $S=D(K_{i(k)}, E(K_{i(k)}, S))$ by using the key $K_{i(k)}$.

Figure 9:
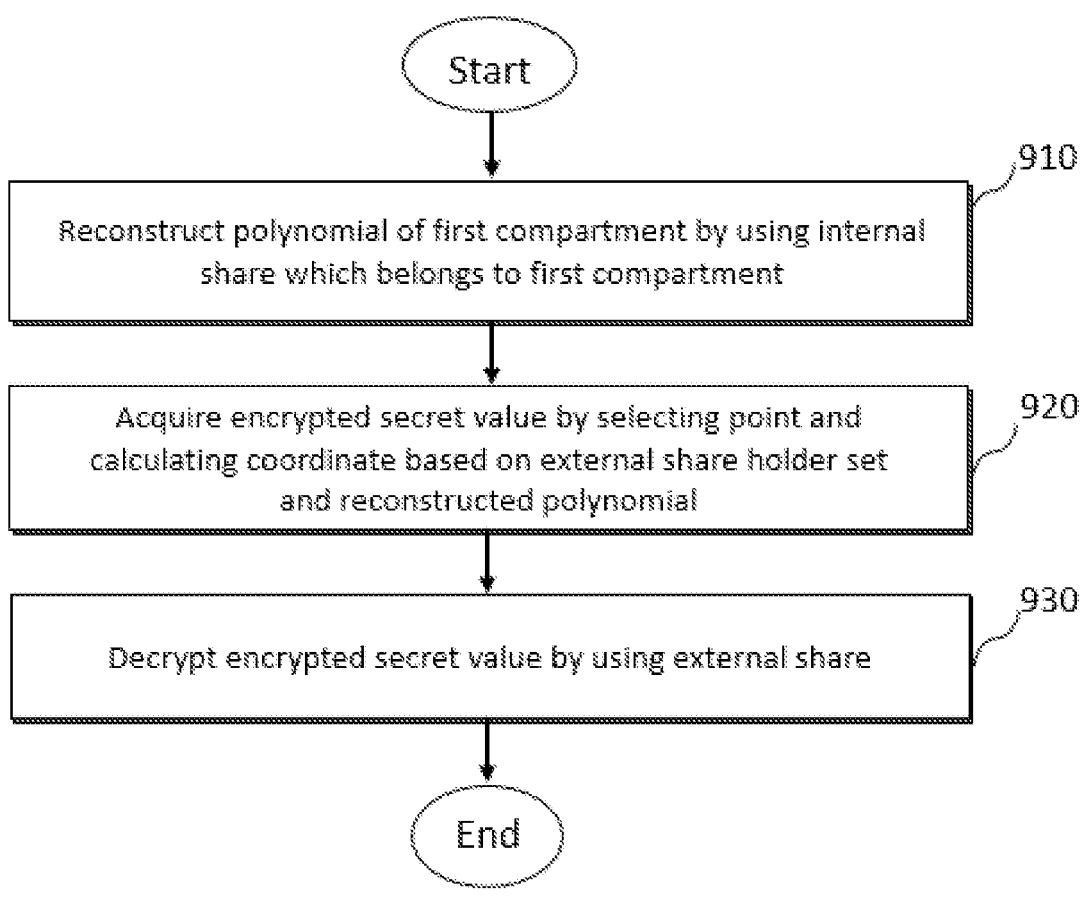
FIG. 9 is a flowchart illustrating a method for reconstructing a secret in a system constituted by a plurality of compartments by using a polynomial interpolation according to various exemplary embodiments of the present disclosure.

FIG. 9 is a flowchart illustrating a method for reconstructing a secret in a system constituted by a plurality of compartments by using a polynomial interpolation according to various exemplary embodiments of the present disclosure.

In operation 910, the electronic device (e.g., the electronic devices 110, 120, and 130 of FIG. 1 or the electronic device 200 of FIG. 2) may reconstruct the first polynomial of the first compartment by using some of the internal shares which belong to the first compartment.

By taking FIG. 5B as an example, the electronic device may reconstruct the polynomial of degree (t–1) $f_i(x)= a_{t-1}x^{t-1}+a_{t-2}x^{t-2}+\ldots,a_{m-1}x^{m-1}x^{m-1}+a_{m-2}x^{m-2}+\ldots a_0$ by using t internal shares which belong to the compartment $C_i$.

In operation 920, the electronic device (e.g., the electronic devices 110, 120, and 130 of FIG. 1 or the electronic device 200 of FIG. 2) may acquire the encrypted secret value $E(K_{i(k)}, S)$ by selecting a point based on an external share holder set $r_i(k)$ and calculating $f_i(n+k)$.

By taking FIG. 5B as an example, the electronic device may acquire the encrypted secret value $E(K_{i(k)}, S)$ by calculating the y-axis coordinate value of the point (n+k, $f_i(n+k)$) among the points through which the reconstructed polynomial $f_i(x)$ passes. The electronic device may calculate $f_i(n+k)$ and acquire the encrypted secret value $E(K_{i(k)}, S)$ by using the relationship $E(K_{i(k)}, S)=f_i(n+k)$.

In operation 930, the electronic device (e.g., the electronic devices 110, 120, and 130 of FIG. 1 or the electronic device 200 of FIG. 2) may decrypt the encrypted secret value by using the external share.

According to various exemplary embodiments, the electronic device may acquire the key $K_i(k)$ required for decryption from $r_i(k)$, and reconstruct the secret S by using the decryption algorithm D(key, ciphertext). The electronic device may reconstruct the secret S as $S=D(K_{i(k)}, E(K_{i(k)}, S))$ by using the key $K_{i(k)}$.

Figure 10:
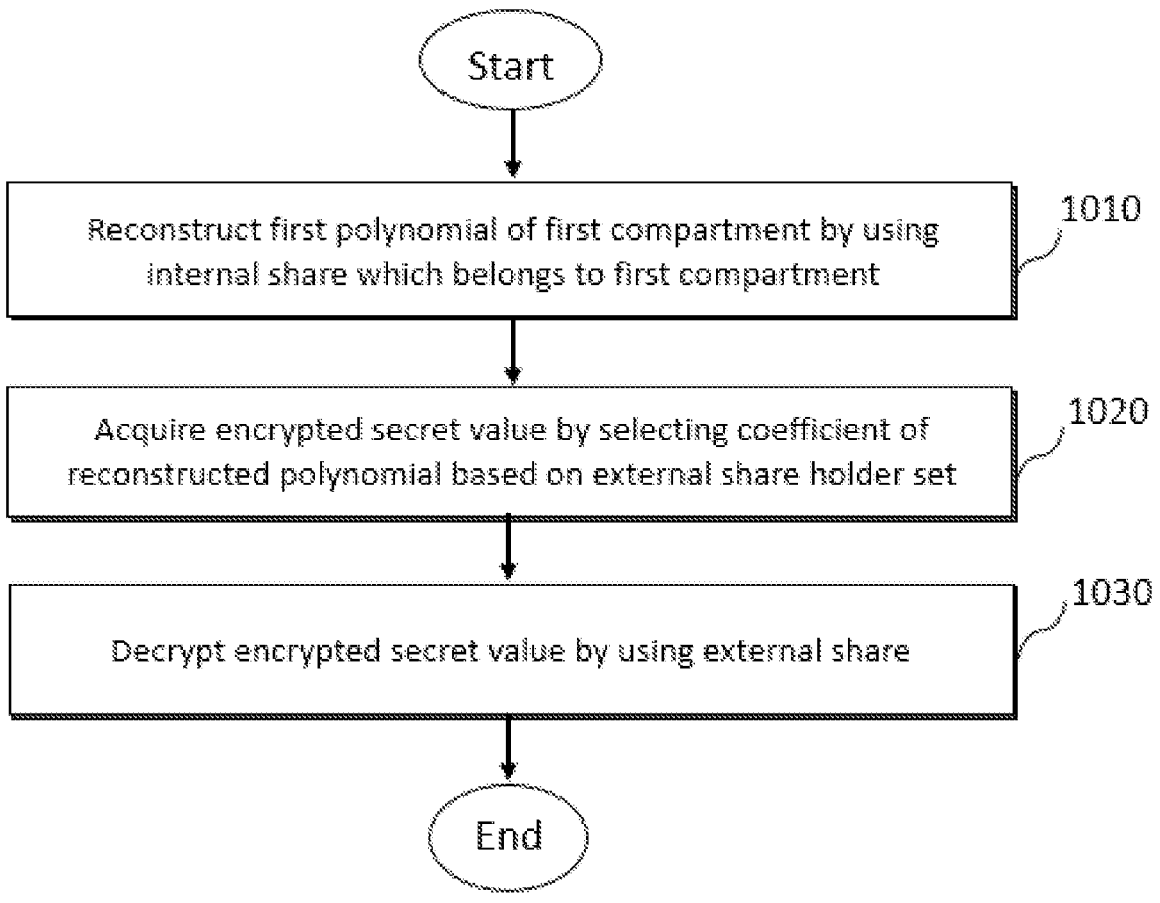
FIG. 10 is a flowchart illustrating a method for reconstructing a secret in a system constituted by a plurality of compartments by using an encrypted polynomial coefficient according to various exemplary embodiments of the present disclosure.

FIG. 10 is a flowchart illustrating a method for reconstructing a secret in a system constituted by a plurality of compartments by using a secret-encoded polynomial coefficient according to various exemplary embodiments of the present disclosure.

In operation 1010, the electronic device (e.g., the electronic devices 110, 120, and 130 of FIG. 1 or the electronic device 200 of FIG. 2) may reconstruct the first polynomial for defining the first compartment by using some of the internal shares which belong to the first compartment.

By taking FIG. 6B as an example, the electronic device may reconstruct the polynomial of degree (t–1) $f_i(x)= a_{t-1}x^{t-1}+a_{t-2}x^{t-2}+\ldots,a_{m-1}x^{m-1}x^{m-1}+a_{m-2}x^{m-2}+\ldots a_0$ by using t internal shares which belong to the compartment $C_i$.

In operation 1020, the electronic device (e.g., the electronic devices 110, 120, and 130 of FIG. 1 or the electronic device 200 of FIG. 2) may acquire the encrypted secret value $E(K_{i(k)}, S)$ by selecting a coefficient of the reconstructed polynomial $f_i(x)$ based on an external share holder set $r_i(k)$.

By taking FIG. 6B as an example, the electronic device may acquire the encrypted secret value $E(K_{i(k)}, S)$ from the (k–1)-th coefficient $a_{k-1}$ in the reconstructed polynomial $f_i(x)=a_{t-1}x^{t-1}+a_{t-2}x^{t-2}+\ldots a_{m-1}x^{m-1}+a_{m-2}x^{m-2}+\ldots a_0$ based on the relationship $E(K_{i(k)}, S)=a_{k-1}$.

In operation 1030, the electronic device (e.g., the electronic devices 110, 120, and 130 of FIG. 1 or the electronic device 200 of FIG. 2) may decrypt the encrypted secret value by using the external share.

According to various exemplary embodiments, the electronic device may acquire the key $K_{i(k)}$ required for decryption from $r_i(k)$, and reconstruct the secret S by using the decryption algorithm D (key, ciphertext). The electronic device may reconstruct the secret S as $S=D(K_{i(k)}, E(K_{i(k)}, S))$ by using the key $K_{i(k)}$.

Figure 11:
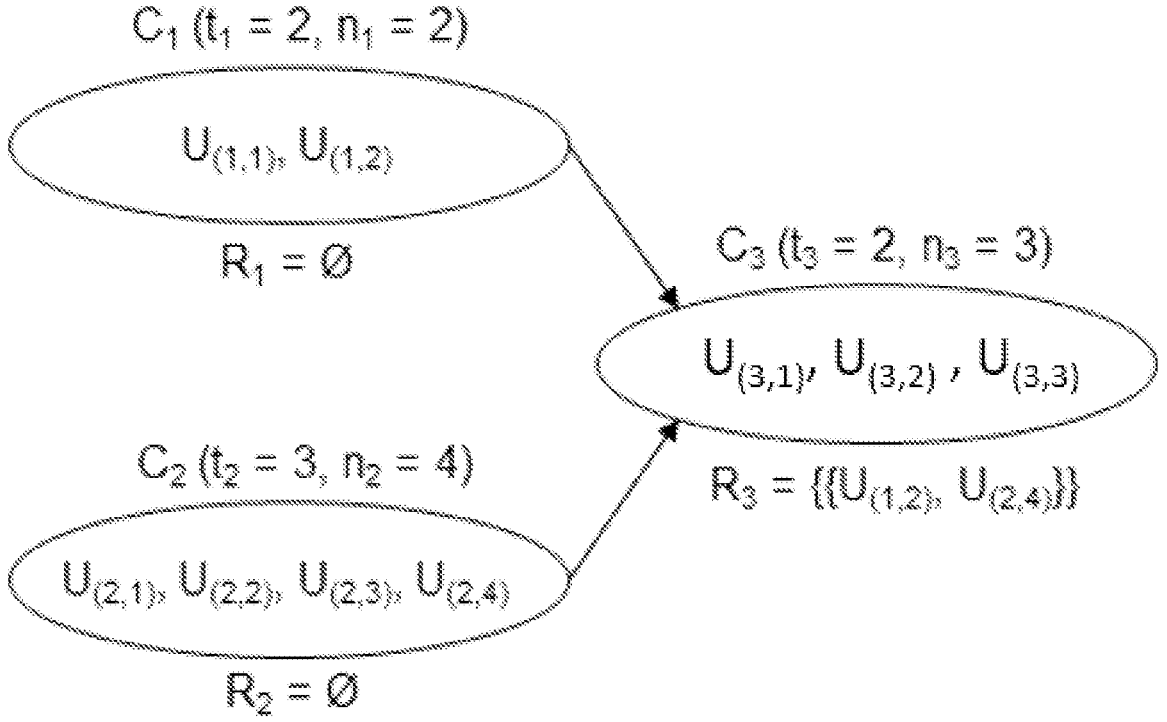
FIG. 11 is a diagram illustrating a state after the internal share of the first compartment is created, related to FIG. 7, as an exemplary embodiment of using the internal share of the first compartment for multi-compartment based secret reconstruction according to various exemplary embodiments of the present disclosure.

FIG. 11 is a diagram illustrating a state after the internal share of the first compartment is created, related to FIG. 7, as an exemplary embodiment of using the internal share of the first compartment for multi-compartment based secret reconstruction according to various exemplary embodiments of the present disclosure.

(Exemplary Embodiment 1) Secret Reconstruction Method For Multi-Compartments Using Polynomial Interpolation According to various exemplary embodiments, the electronic device may reconstruct the secret by using two internal shares $V_{(3, 2)}$ and $V_{(3, 3)}$ and one external share set $\{V_{(1, 2)}, V_{(2, 4)}\}$ in the compartment $C_3$ referring to FIG. 11. The electronic device may reconstruct the polynomial $f_3(x)=3x+14$ on a finite field $F_{19}$ by the Lagrange interpolation by using two internal shares $V_{(3, 2)}=1$ and $V_{(3, 3)}=4$. Since the encrypted secret is the y-axis coordinate value of the point $(n_3+1, E(K_{3(1)}, S))$ and $n_3=3$, the electronic device may acquire $E(K_{3(1)}, S)=f_3(4)=7$. Further, the electronic device may acquire $K_{3(1)}$ from $r_{3(1)}$, and acquire $S=D(K_{3(1)}, E(K_{3(1)}, S))=D(K_{3(1)}, 7)=8$.

(Exemplary Embodiment 2) Secret Reconstruction Method For Multi-Compartments Using Secret-Encoded Polynomial Coefficient According to various exemplary embodiments, the electronic device may reconstruct the secret by using two internal shares $V_{(3, 2)}$ and $V_{(3, 3)}$ and one external share set $\{V_{(1, 2)}, V_{(2, 4)}\}$ in the compartment $C_3$ with respect to FIG. 11. The electronic device may reconstruct the polynomial $f_3(x)=3x+7$ on a finite field $F_{19}$ by the Lagrange interpolation by using two interval shares $V_{(3, 2)}=13$ and $V_{(3,3)}=16$. Further, the electronic device may find the coefficient $a_0$ in the reconstructed polynomial $f_3(x)=3x+7$ and determine $E_{(K3(1)}, S)=a_0=7$. Further, the electronic device may acquire $K_{3(1)}$ from $r_3(1)$ and acquire $S=D(K_{3(1)}, E(K_{3(1)}, S))= D(K_{3(1)}, 7)=8$.

Figure 12:
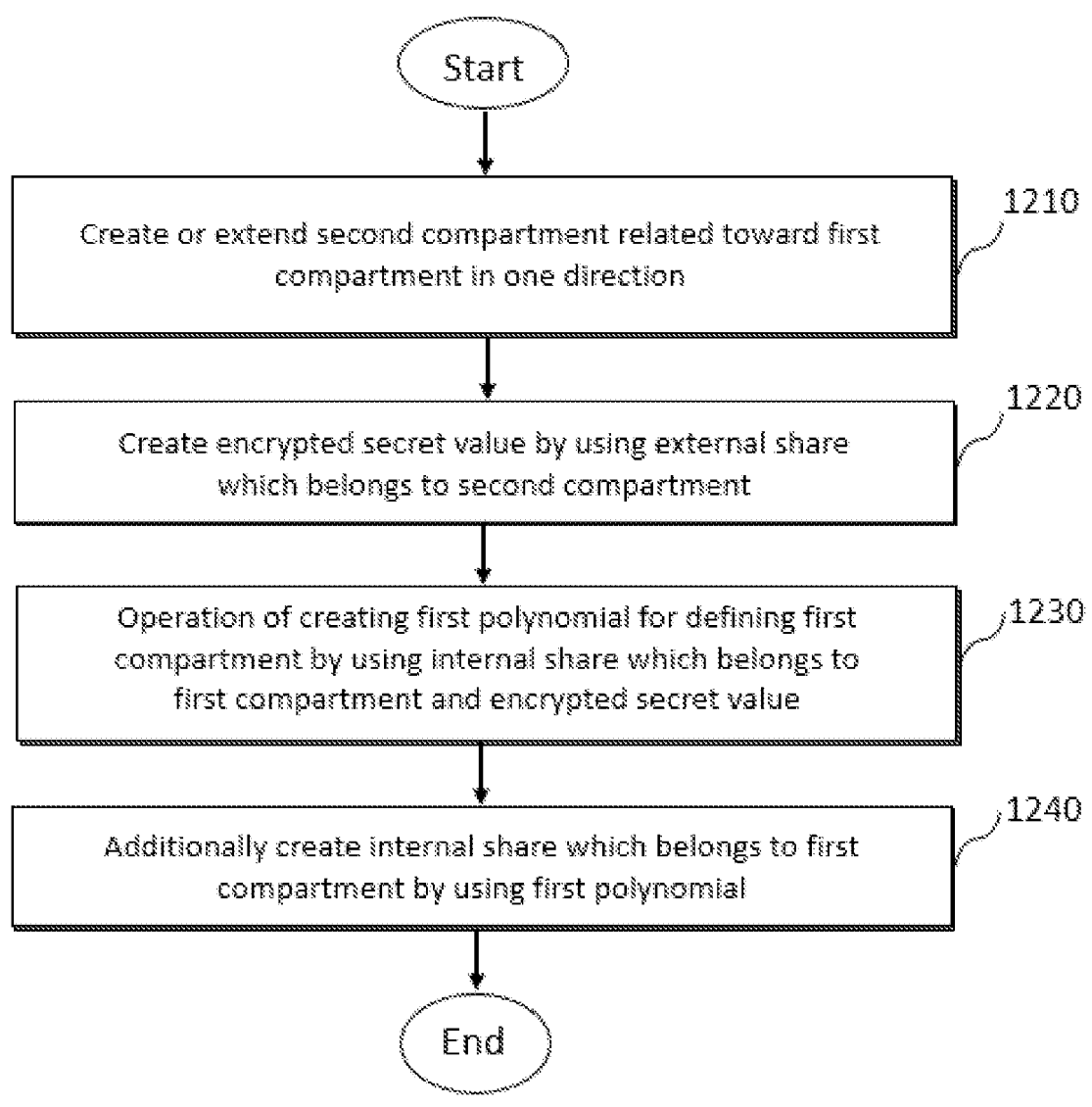
FIG. 12 is a flowchart illustrating a method for adding a new external share required for secret reconstruction to the access structure of the first compartment without influencing the existing shares in the access structure for multi-compartment based secret sharing according to various exemplary embodiments of the present disclosure.

FIG. 12 is a flowchart illustrating a method for adding a new external share required for secret reconstruction to the access structure of the first compartment without influencing the existing shares in the access structure for multi-compartment based secret sharing according to various exemplary embodiments of the present disclosure.

In FIG. 12, a method for adding a new external share set $r_{i(m+1)}$ to $R_i$ for the compartment $C_i$ is illustrated. It is assumed that a key $K_{i(m+1)}$ may be obtained from $r_{i(m+1)}$.

When the new external share set $r_{i(m+1)}$ is added, n which is the number of internal shares, the threshold t, and the polynomial $f_i(x)$ of the first compartment $C_i$ may be changed. For example, when the number of internal shares and the threshold after a change are n* and t*, respectively, arbitrary n* and t* satisfying n*≥t*≥n+m+1 may be selected.

In FIG. 12, it is assumed that n* and t* are first selected, and a new created polynomial after the change may be represented as $f_i^*(x)$.

Referring to FIG. 12, in operation 1210, the electronic device (e.g., the electronic devices 110, 120, and 130 of FIG. 1 or the electronic device 200 of FIG. 2) may create a new second compartment or extend an existing second compartment related toward the first compartment in one direction.

According to various exemplary embodiments, the second compartment may be defined as a compartment including a new external share set $r_{i(m+1)}$ required for secret reconstruction in the first compartment $C_i$.

According to various exemplary embodiments, the access structure of the first compartment may already include shares related to the first compartment. The access structure of the first compartment may include, for example, both internal shares which belong to the first compartment and external shares which do not belong to the first compartment. For example, the first compartment may not have an external compartment related toward the first compartment in one direction. When there is no external compartment related to the first compartment, the access structure of the first compartment may be constituted by only the internal shares which belong to the first compartment. In this case, when the new external share set required for reconstructing the secret is added to the access structure of the first compartment, the second compartment with respect to the first compartment may be created. As another example, when there is the external compartment related to the first compartment, the access structure of the first compartment may be constituted by the internal shares which belong to the first compartment and the external shares which do not belong to the first compartment. In this case, when the new external share set required for reconstructing the secret is added to the access structure of the first compartment, the second compartment with respect to the first compartment may be extended.

In operation 1220, the electronic device (e.g., the electronic devices 110, 120, and 130 of FIG. 1 or the electronic device 200 of FIG. 2) may create an encrypted secret value by using the external shares of the new external share set $r_{i(m+1)}$ which belongs to the second compartment.

For example, the electronic device may create the value $E(K_{i(m+1)}, S)$ for encrypting the secret S by using the key $K_{i(m+1)}$ which may be acquired from the new external share set $r_{i(m+1)}$ and the encryption algorithm E(key, plaintext).

In operation 1230, the electronic device (e.g., the electronic devices 110, 120, and 130 of FIG. 1 or the electronic device 200 of FIG. 2) may create a new first polynomial for defining the first compartment by using all of the internal shares which belongs to the first compartment and the encrypted secret values.

When the encrypted secret values are used as point coordinates, for example, the electronic device may create a new polynomial of degree (t−1) $f_i(x)=a_{t-1}x^{t-1}+a_{t-2}x^{t-2}+ \ldots, a_{m-1}x^{m-1}+a_{m-2}x^{m-2}+ \ldots a_0$ passing through (m+1) points $(n^*+1, E(K_{i(1)}, S)), (n^*+2, E(K_{i(2)}, S)), \ldots, (n^*+m, E(K_{i(m)}, S))$, and $(n^*+m+1, E(K_{i(m+1)}, S))$ defined by (m+1) encrypted secret values and n points $(1, V_{(i, 1)}), (2, V_{(i,2)}), \ldots, (n, V_{(i, n)})$ determined by the internal shares of the first compartment. In this case, when t*>n+m+1, (t*−n−m−1) remaining coefficients may be randomly selected.

When the encrypted secret values are used as polynomial coefficients, for example, the electronic device may create a new polynomial of degree (t−1) $f_i(x)=a_{t-1}x^{t-1}+a_{t-2}x^{t-2}+ \ldots, a_mx^m+a_{m-1}x^{m-1}+a_{m-2}x^{m-2}+ \ldots a_0$ having (m+1) coefficients $a_m=E(K_{i(m+1)}, S) a_{m-1}=E(K_{i(m)}, S), a_{m-2}=E(K_{i(m-1)}, S), \ldots, a_0=E(K_{i(1)}, S)$ defined by (m+1) encrypted secret values and passing through n points $(1, V_{(i, 1)}), (2, V_{(i, 2)}), \ldots, (n, V_{(i, n)})$ determined by the internal shares of the first compartment. In this case, when t*>n+m+1, (t*−n−m−1) remaining coefficients may be randomly selected.

In operation 1240, the electronic device (e.g., the electronic devices 110, 120, and 130 of FIG. 1 or the electronic device 200 of FIG. 2) may additionally create an internal share which belongs to the first compartment by using the first polynomial.

For example, the electronic device may additionally create (n*−n) internal shares $V_{(i, n+1)}=f_i^*(n+1), V_{(i, n+2)}=f_i^*(n+2), \ldots, V_{(i, n^*)}=f_i^*(n^*)$ from the points (n+1, $f_i^*(n+1)$), (n+2, $f_i^*(n+2)$), $\ldots$, (n*, $f_i^*(n^*)$) through which the polynomial $f_i^*(x)$ passes.

Figure 13:
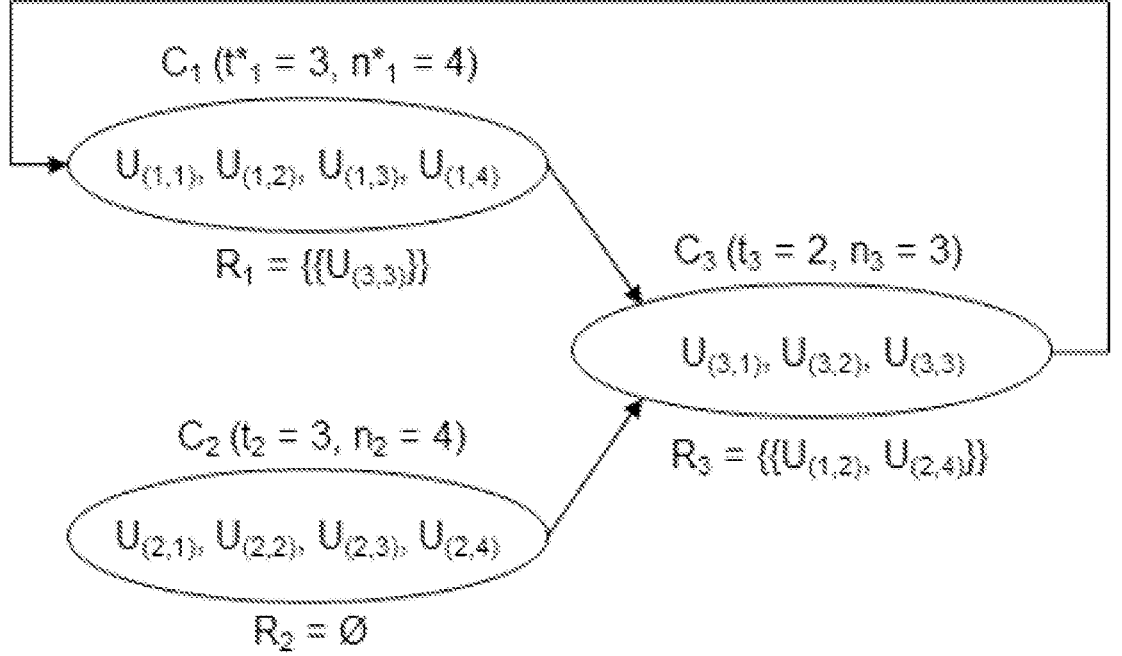
FIG. 13 is a diagram illustrating an exemplary embodiment of adding a new external share required for secret reconstruction to $R_i$ in the state of FIG. 11 in which internal shares for the first compartment are already assigned for multi-compartment based secret sharing according to various exemplary embodiments of the present disclosure.

FIG. 13 is a diagram illustrating an exemplary embodiment of adding a new external share set $r_{i(m+1)}$ to $R_i$ in the state of FIG. 11 in which internal shares for the first compartment $C_1$ are already assigned for multi-compartment based secret sharing according to various exemplary embodiments of the present disclosure.

According to the exemplary embodiment of FIG. 13, the electronic device may add an external share set without influencing the existing shares. This may be used when implementing a secret sharing system expressed by a directed graph with a cycle.

Referring back to FIG. 11, a case of $R_1=\emptyset$ for the compartment $C_1$, a case where the external share is not required for reconstructing the secret is assumed. However, according to various exemplary embodiments, the electronic device may utilize the exemplary embodiment even when there is an external share set in $R_1$ for the compartment $C_1$.

In FIG. 13, a case where an external share $V_{(3, 3)}=4$ is required to reconstruct the secret in the compartment $C_1$ is assumed. That is, an exemplary embodiment for a change for achieving $R_1=\{\{U_{(3, 3)}\}\}$ is illustrated.

Referring back to FIG. 11, two shares $V_1=\{V_{(1, 1)}, V_{(1, 2)}\}$, that is, $V_{(1, 1)}=6, V_{(1, 2)}=0$ generated by a $(t_1=2, n_1=2)$ sharing method by using the randomly generated polynomial $f_i(x)=13x+12$ may be assigned to the compartment $C_1$. Since $m_1=0$, new $t_1^*$ and $n_1^*$ satisfying $n_1^*≥t_1^*≥n_1+m_1+1=3$ may be selected. For example, $t_1^*=3, n_1^*=4$ may be newly selected.

(Exemplary embodiment 1) One point (n*+1, $E(K_{1(1)}, S)$) having the encrypted secret value as the y-axis coordinate may be generated by using the encryption key $K_{1(1)}$ which may be from the external share $V_{(3, 3)}$, and the encryption algorithm E( ). When $E(K_{1(1)}, S)=13$, a new polynomial of degree (t*−1) $f_1^*(x)$, that is, $f_1^*(x)=x^2+10x+14$ may be generated, which passes through the created point (n*+1=5, $E(K_{1(1)}, S)=13$) and two points (1, 6) and (2, 0) determined by the original shares $V_{(1, 1)}=6$ and $V_{(1, 2)}=0$. The electronic device may additionally create two internal shares $V_{(1, 3)}=f_1^*(3)=15$ and $V_{(1,4)}=f_1^*(4)=13$ from the points $(n_1+1, f_1^*(n_1+1)), (n+2, f_1^*(n+2))$ through which the polynomial $f_1^*(x)$ passes, that is, (3, 15) and (4, 13).

(Exemplary embodiment 2) A coefficient $a_0=E(K_{1(1)}, S)$ may be created by using the secret S, the encryption key $K_{1(1)}$ which may be from the external share $V_{(3, 3)}$, and the encryption algorithm E( ). When $a_0=E(K_{1(1)}, S)=13$, a polynomial of degree (t*−1) $f_1^*(x)=10x^2+21x+13$ may be created, which has the created coefficient $a_0$ and passes through two points (1, 6) and (2, 0) determined by the existing shares $V_{(1, 1)}=6$ and $V_{(1, 2)}=0$. The electronic device may additionally create two internal shares $V_{(1, 3)}=f_1*(3)=14$ and $V_{(1,4)}=f_1*(4)=10$ from the points $(n_1+1, f_1*(n_1+1))$, $(n+2, f_1*(n+2))$ through which the polynomial $f_1*(x)$ passes, that is, (3, 14) and (4, 10).

Figure 14:
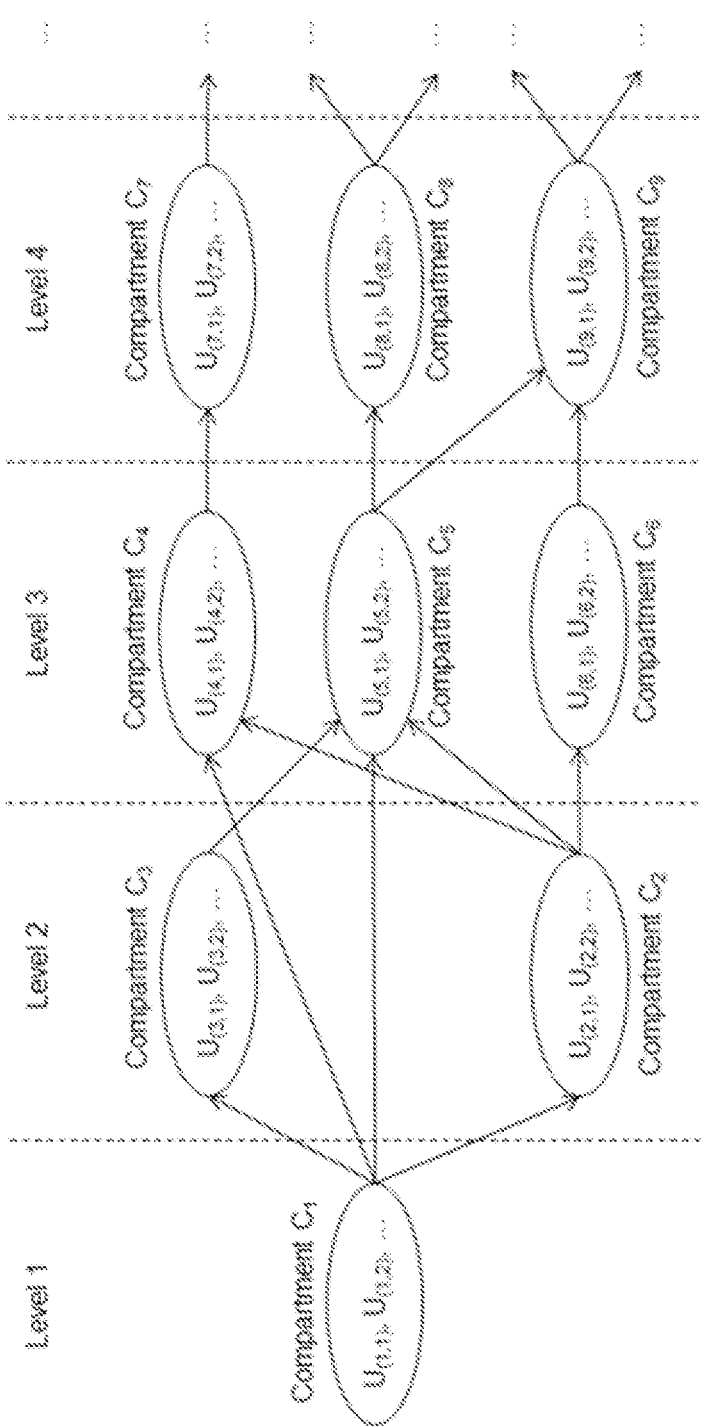
FIG. 14 is an exemplary diagram illustrating a generalized hierarchical secret sharing system according to various exemplary embodiments of the present disclosure.

FIG. 14 is an exemplary diagram illustrating various hierarchical secret sharing systems according to various exemplary embodiments of the present disclosure.

The present disclosure which generalizes the conjunctive hierarchical secret sharing method such as Tassa's method provides three advantages.

First, various hierarchical secret sharing systems may be configured. In particular, it becomes possible to make a plurality of compartments in one level. When the secret sharing system of FIG. 3 expressed by a directed acyclic graph is drawn again by using topological sorting, a hierarchical structure of FIG. 14 may be created.

Referring to FIG. 14, several compartments may be present in one level, and there is no limitation even in the number of levels. For reference, in the method of Tassa using the derivative, only one compartment may be present in one level, and the number of levels is also constrained by the degree of an initial polynomial.

Second, an arbitrary access structure may be defined. By including arbitrary external shares in the access structure, various secret reconstruction conditions may be specified as well as the conjunctive condition in the Tassa's method.

Third, the present disclosure is based on the polynomial, so the Lagrange interpolation may be used. The Lagrange interpolation is less complicated and its implementation is easier than the Birkhoff interpolation required when the derivative is used.

Features, structures, effects, and the like described in the above exemplary embodiments are included in at least one embodiment of the present disclosure, and are not particularly limited to only one exemplary embodiment. Furthermore, features, structures, effects, and the like exemplified in each embodiment may be combined or modified for other exemplary embodiments those skilled in the art to which the exemplary embodiments pertain. Therefore, the contents related to such combinations and modifications should be interpreted as being included in the scope of the present disclosure.

In addition, although the exemplary embodiments have been mainly described above, these are merely examples and do not limit the present disclosure, and those skilled in the art to which the present disclosure pertains will be able to know that various modifications and applications not illustrated above may be made within the scope without departing from the essential characteristics of the exemplary embodiment. For example, each component specifically shown in the exemplary embodiment may be implemented by being modified. In addition, it will be interpreted that differences related to the modifications and applications are included in the scope of the present disclosure defined in the appended claims.

What is claimed is:

1. A method for threshold secret sharing for multi-compartments performed by an electronic device including a processor, the method comprising:

an operation of creating, by the processor, when at least one second compartment is configured at a higher level than a first compartment in one direction, an encrypted secret value by using an external share which does not belong to the first compartment, but belongs to the at least one second compartment;

an operation of creating, by the processor, a first polynomial for defining the first compartment by using the encrypted secret value; and an operation of creating, by the processor, an internal share of the first compartment by using the first polynomial.

2. The method for threshold secret sharing for multi-compartments according to claim 1, wherein the operation of creating the first polynomial for defining the first compartment by using the encrypted secret value further includes an operation of creating at least one point having the encrypted secret value as a coordinate value, and an operation of creating the first polynomial passing through the created point.

3. The method for threshold secret sharing for multi-compartments according to claim 2, further comprising:

an operation of creating m points having an encrypted secret value as a coordinate;

an operation of creating the first polynomial passing through m created point.

4. The method for threshold secret sharing for multi-compartments according to claim 1, wherein the operation of creating the first polynomial for defining the first compartment by using the encrypted secret value includes an operation of creating at least one coefficient by using the encrypted secret value; and an operation of creating the first polynomial by using the encrypted secret value as a coefficient of the first polynomial.

5. The method for threshold secret sharing for multi-compartments according to claim 4, further comprising:

an operation of creating m coefficients by using m encrypted secret values as the coefficients of the first polynomial.

6. The method for threshold secret sharing for multi-compartments according to claim 1, comprising:

an operation of assigning the internal share to a participant of the first compartment.

7. A method for threshold secret reconstruction for multi-compartments performed by an electronic device including a processor, the method comprising:

an operation of reconstructing, by the processor, when at least one second compartment is configured at a higher level than a first compartment in one direction, a first polynomial of the first compartment by using at least one internal share which belongs to the first compartment;

an operation of acquiring, by the processor, an encrypted secret value by using the reconstructed first polynomial and an external share which belongs to the at least one second compartment; and an operation of decrypting, by the processor, the encrypted secret value by using the external share to reconstruct a secret S.

8. The method for threshold secret reconstruction for multi-compartments according to claim 7, wherein the operation of decrypting the encrypted secret value includes an operation of reconstructing the secret S by decrypting a coordinate of a point through which the reconstructed first polynomial passes.

9. The method for threshold secret reconstruction for multi-compartments according to claim 8, further comprising:

an operation of acquiring a cryptographic key for decryption from an external share set.

10. The method for threshold secret reconstruction for multi-compartments according to claim 7, wherein the operation of decrypting the secret by using the encrypted secret value further includes an operation of reconstructing the encrypted secret S by decrypting a coefficient of the reconstructed first polynomial.

11. The method for threshold secret reconstruction for multi-compartments according to claim 10, further comprising:

an operation of acquiring a cryptographic key for decryption from an external share set.

12. The method for threshold secret reconstruction for multi-compartments according to claim 7, wherein the operation of reconstructing the first polynomial for the first compartment by using the at least one internal share which belongs to the first compartment includes an operation of calculating the first polynomial of the first compartment based on a Lagrange interpolation.

13. The method for threshold secret sharing for multi-compartments according to claim 1, wherein creating the first polynomial by using the encrypted secret value establishes an arbitrary access structure enabling a plurality of compartments in a single hierarchical level without using polynomial derivatives, thereby reducing system complexity for hierarchical secret sharing.

14. The method for threshold secret reconstruction for multi-compartments according to claim 7, wherein the encrypted secret value enables the processor to reconstruct the secret S by applying a Lagrange interpolation instead of a Birkhoff interpolation, thereby reducing computational complexity.

* * * * *